US012801844B2

(12) United States Patent
Ezrielev et al.

(10) Patent No.: US 12,801,844 B2
(45) Date of Patent: Nov. 17, 2026

(54) MANAGING INFERENCE MODEL CORRECTNESS

(71) Applicant: Dell Products L.P., Round Rock, TX (US)

(72) Inventors: Ofir Ezrielev, Be'er Sheva (IL); Jehuda Shemer, Kfar Saba (IL); Onur Celebioglu, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 224 days.

(21) Appl. No.: 18/899,227

(22) Filed: Sep. 27, 2024

(65) Prior Publication Data

US 2026/0093912 A1 Apr. 2, 2026

(51) Int. Cl.
*G06F 40/20* (2020.01)

(52) U.S. Cl.
CPC .................................... *G06F 40/20* (2020.01)

(58) Field of Classification Search
CPC .......... G06F 40/20; G06F 40/30; G06F 21/15; G06N 5/04; G06N 5/045; G06N 3/0454; G06N 5/046; G06N 20/20; G06N 40/56; G06N 3/08; G06N 7/026; H04M 3/4936; H04M 3/4938; H04M 2203/355; H04M 2201/40; H04M 2201/60; G10L 15/22; G10L 2015/228; G10L 15/26; G05B 13/0275
See application file for complete search history.

(56) References Cited

U.S. PATENT DOCUMENTS

| | | | |
|---|---|---|---|
| 8,060,812 B2 | 11/2011 | Branda et al. |
| 8,650,646 B2 | 2/2014 | Rubin et al. |
| 8,856,936 B2 | 10/2014 | Datta Ray et al. |
| 11,059,348 B2 | 7/2021 | Yu et al. |
| 11,354,602 B2 | 6/2022 | Kursun |

(Continued)

OTHER PUBLICATIONS

Menno van Zaanen, "Bootstrapping Structure using Similarity", arXiv:cs/0104005v1, Apr. 3, 2001, retrieved from <https://arxiv.org/pdf/cs/0104005> on Sep. 25, 2024 (11 pages).

(Continued)

*Primary Examiner* — Yogeshkumar Patel
(74) *Attorney, Agent, or Firm* — WOMBLE BOND DICKINSON (US) LLP

(57) ABSTRACT

Methods and systems for managing inference models are disclosed. To do so, a first inference model that is deemed both internally consistent and correct may be used to evaluate an internal consistency and a correctness of a second inference model hosted by a remote resource. An inference model consistency test may be performed using a set of prompts deemed consistent by the first inference model to determine whether the second inference model is internally consistent. An inter-inference model consistency test may be performed using the set of prompts to determine whether the second inference model is consistent with the first inference model and, therefore, is consistent. If a first information content of a first set of responses generated by the second inference model is consistent with a second information content of a second set of responses generated by the first inference model, the second inference model may be correct.

20 Claims, 10 Drawing Sheets

(56) References Cited

U.S. PATENT DOCUMENTS

| | | | | |
|---|---|---|---|---|
| 11,704,409 | B2 | 7/2023 | Miller et al. | |
| 11,861,937 | B2 | 1/2024 | Han et al. | |
| 12,008,332 | B1 * | 6/2024 | Gardner | G06F 40/56 |
| 2019/0349204 | A1 | 11/2019 | Enke et al. | |
| 2021/0065063 | A1 * | 3/2021 | Gazzetti | G06N 20/20 |
| 2021/0097431 | A1 * | 4/2021 | Olgiati | G06N 20/00 |
| 2024/0202466 | A1 * | 6/2024 | Zha | G06N 5/04 |
| 2024/0220607 | A1 * | 7/2024 | Ezrielev | G06F 21/55 |
| 2024/0281410 | A1 * | 8/2024 | Williams | G06F 16/122 |

OTHER PUBLICATIONS

Bacher et al., "A Non-Parametric Subspace Analysis Approach with Application to Anomaly Detection Ensembles", arXiv:2101.04932, Jan. 13, 2021, retrieved from <https://arxiv.org/pdf/2101.04932> on Sep. 25, 2024 (41 pages).

Prothero et al., "Data Integration Via Analysis of Subspaces (DIVAS)", arXiv:2212.00703, Jan. 17, 2024, retrieved from <https://arxiv.org/pdf/2212.00703> on Sep. 25, 2024, pp. 1-52 (52 pages).

"Digital Authenticity: Provenance and Verification in AI-Generated Media". Webpage <https://www.numbersprotocol.io/blog/digital-authenticity-provenance-and-verification-in-ai-generated-media>, 9 pages, Dec. 5, 2023, retrieved from Internet Archive Wayback Machine <https://web.archive.org/web/20240113104942/https://www.numbersprotocol.io/blog/digital-authenticity-provenance-and-verification-in-ai-generated-media> on Sep. 26, 2024.

Adam Rowe, "9 Simple Ways to Detect AI Images (With Examples) in 2024", tech.co, Nov. 22, 2023, retrieved from <https://tech.co/news/ways-detect-ai-images-examples> on Sep. 26, 2024 (6 pages).

Zhong et al., "Rich and Poor Texture Contrast: A Simple yet Effective Approach for AI-generated Image Detection", arXiv:2311.12397v2, Dec. 10, 2023 (17 pages).

Sina Mchunu, "How to Detect AI Content in 2024", WebFX, May 19, 2023, retrieved from <https://www.webfx.com/blog/content-marketing/how-to-detect-ai-content/> retrieved on Sep. 26, 2024 (12 pages).

Rachel Gordon, "Better fact-checking for fake news", MIT News on Campus and Around the World, Oct. 17, 2019 (7 pages).

Harran et al., "A Method For Verifying Integrity And Authenticating Digital Media", Forensic Focus, Jun. 9, 2017, retrieved from <https://www.forensicfocus.com/articles/a-method-for-verifying-integrity-and-authenticating-digital-media/> on Sep. 26, 2024 (16 pages).

Boland et al., "Ten Simple Rules to Enable Multi-site Collaborations through Data Sharing", PLoS Comput Biol. Jan. 19, 2017;13(1):e1005278. doi: 10.1371/journal.pcbi.1005278. PMID: 28103227; PMCID: PMC5245793, retrieved from <https://www.ncbi.nlm.nih.gov/pmc/articles/PMC5245793/> on Sep. 26, 2024 (15 pages).

Kate Vitasek, "Collaborative Bidding? It's Not An Oxymoron", Forbes, updated Jun. 26, 2018, retrieved from <https://www.forbes.com/sites/katevitasek/2018/06/26/collaborative-bidding-its-not-an-oxymoron/> on Sep. 26, 2024 (5 pages).

"Analyzing Bids and Awarding Events", Oracle, People Soft Strategic Sourcing 9.1 PeopleBook, 13 pages, retrieved from <https://docs.oracle.com/cd/E27605_01/fscm91pbr2/eng/psbooks/mssg/chapter.htm?File=mssg/htm/mssg16.htm> on Sep. 26, 2024.

"Ensuring Data Integrity with Hash Codes", Microsoft, Jan. 3, 2023, retrieved from <https://learn.microsoft.com/en-us/dotnet/standard/security/ensuring-data-integrity-with-hash-codes> on Sep. 26, 2024 (3 pages).

* cited by examiner

MANAGING INFERENCE MODEL CORRECTNESS

FIELD

Embodiments disclosed herein relate generally to managing inference models. More particularly, embodiments disclosed herein relate to systems and methods to manage correctness of inference models.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components and the components of other devices may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Figure 1:
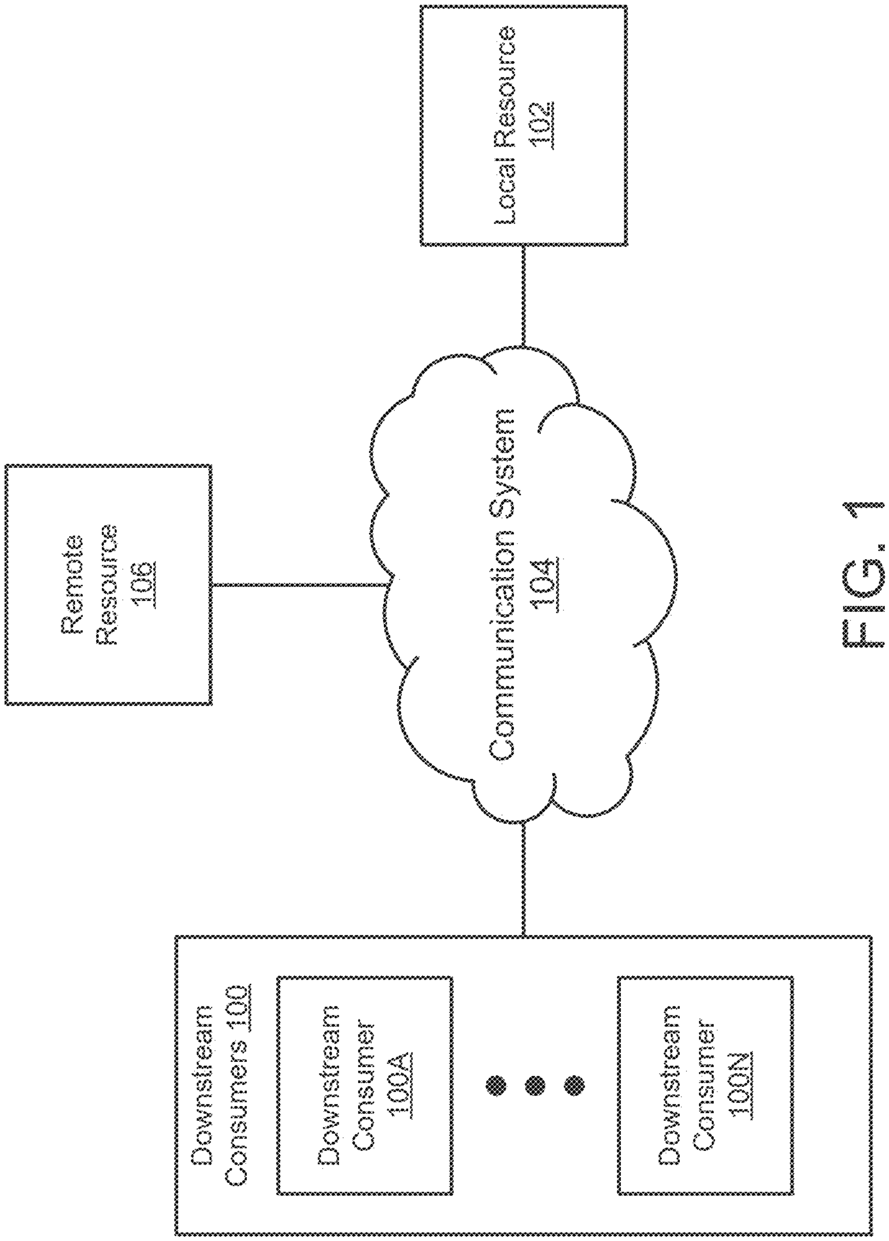
FIG. 1 shows a block diagram illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for managing inference models. An inference model may be a generative artificial intelligence (AI) model (e.g., a large language model (LLM)) and may generate responses when provided with prompts. The responses may be used, at least in part, to provide computer-implemented services. However, a quality of the computer-implemented services may be impacted by an extent to which the inference model is internally consistent and/or correct.

For example, an inference model may be deemed internally consistent when a set of responses generated by the inference model (e.g., when provided with a set of prompts intended to elicit a first same information content) have a second same information content (e.g., to an extent considered acceptable based on any criteria). However, the inference model may be deemed correct when the second same information content matches (e.g., within a threshold) the first same information content.

Inference models used to generate the set of responses may be hosted (e.g., operated) by a remote resource (e.g., a third-party entity) and utilizing the inference models (e.g., as part of providing computer-implemented services) may include: (i) providing prompts to the remote resource and/or (ii) obtaining responses generated by the inference model from the remote resource. Consequently, methods of training the inference model and/or tests performed to evaluate an internal consistency and/or a correctness of the inference model may be unknown. To determine whether the inference model is to be used as part of providing the computer-implemented services, an evaluation process may be performed to evaluate the internal consistency and/or the correctness of the inference model.

To evaluate the internal consistency and/or the correctness of the inference model, prompts may be provided to the inference model and responses based on the prompts may be evaluated (e.g., by a subject matter expert (SME)). This process (e.g., providing the prompts, obtaining the responses, evaluating the responses) may continue for any number of prompts until it is concluded that the inference model is sufficiently internally consistent and correct (e.g., based on any criteria for internal consistency and/or correctness).

However, evaluation of the inference model may consume an undesirable quantity of resources (e.g., computational resources, time resources, cognitive resources). In addition, the remote resource may update the inference model over time (e.g., may replace the inference model with another inference model, may modify at least a portion of the inference model). In response to an update to the inference model, the internal consistency and/or the correctness of the inference model may be re-evaluated. Performing additional evaluation processes upon any update to the inference model may also, over time, consume an undesirable quantity of the resources that may otherwise be allocated to providing the computer-implemented services.

To reduce resource expenditure during evaluation of an internal consistency and/or a correctness of an inference model, a trusted inference model may be used. The trusted inference model may be a first generative AI model (e.g., a first LLM) and the trusted inference model may have been deemed as internally consistent and correct. Consequently, the trusted inference model may be trusted for use in evaluation of other inference models for which an internal consistency and/or a correctness is unknown.

To use the trusted inference model (e.g., the first inference model) to evaluate an internal consistency of a second inference model, a set of prompts may be obtained using a local resource. The local resource may be owned by a first owner and the first owner may not have control over the remote resource. The set of prompts may be provided to the second inference model and a first set of responses may be received from the second inference model (e.g., via the remote resource). Each response of the first set of responses may include an output generated by the second inference model following ingestion of a respective prompt of the set of prompts. The set of prompts may be intended to elicit responses with a same information content. However, each prompt of the set of prompts may use a different phrasing from phrasings used by other prompts of the set of prompts. Therefore, the first inference model may be used to evaluate agreement between the information content of each response of the first set of responses to determine whether the second inference model is internally consistent.

If the second inference model is determined to be internally consistent, an inter-inference model consistency test may be performed to determine whether the second inference model is correct. To do so, a second set of responses may be generated using the set of prompts and the first inference model. A second same information content of the second set of responses, therefore, may be considered correct due to the first inference model being deemed correct when the second set of responses was generated. A first same information content of the first set of responses may be compared to the second same information content to obtain a level of similarity. If the level of similarity meets a level of similarity threshold, the second inference model may be consistent with the first inference model and, therefore, may be deemed correct.

Thus, embodiments disclosed herein may address, among other technical problems, the technical challenge of evaluating an internal consistency and/or a correctness of an inference model hosted by a remote resource. By utilizing a trusted inference model that is deemed internally consistent and correct to evaluate the internal consistency and/or correctness of the inference model, a resource cost of evaluating the inference model may be reduced. Consequently, a likelihood of providing computer-implemented services to downstream consumers as desired may be increased.

In an embodiment, a method for managing inference models is provided. The method may include: performing, using a set of prompts deemed to be consistent by a first inference model of the inference models that is deemed to be both internally consistent and correct, an inference model consistency test to determine whether a second inference model of the inference models is internally consistent; in an instance of the performing in which the second inference model is internally consistent: performing, using the set of prompts, an inter-inference model consistency test to determine whether the second inference model is consistent with the first inference model; in an instance of the performing where the second inference model is consistent with the first inference model: concluding that the second inference model is both internally consistent and correct; and providing computer-implemented services using at least the second inference model.

Performing the inference model consistency test may include: obtaining the set of prompts, the set of prompts being obtained using, at least in part, the first inference model; and obtaining, using the set of prompts, a first set of responses from the second inference model of the inference models.

Performing the inference model consistency test may also include: performing, using the first inference model and the first set of responses, a first agreement testing process to obtain first levels of agreement; making a determination regarding whether the first levels of agreement meet criteria; in a first instance of the determination in which the first levels of agreement meet the criteria: concluding that the second inference model is internally consistent; and in a second instance of the determination in which the first levels of agreement do not meet the criteria: concluding that the second inference model is not internally consistent.

Performing the first agreement testing process may include: prompting the first inference model to compare an information content of at least a first response of the first set of responses and a second response of the first set of responses; and obtaining an output from the first inference model, the output being usable to obtain the first levels of agreement.

The first response may have a first information content, the second response may have a second information content, and the first levels of agreement may indicate a degree of similarity between at least the first information content and the second information content.

Performing the inter-inference model consistency test may include: obtaining a second set of responses, the second set of responses being generated by the first inference model using the set of prompts; comparing a first same information content of the first set of responses to a second same information content of the second set of responses to obtain a level of similarity between the first same information content and the second same information content; and making a determination regarding whether the level of similarity meets a level of similarity threshold.

The method may also include: in a second instance of the performing where the second inference model is not consistent with the first inference model: provisionally rejecting the second inference model for use in providing the computer-implemented services.

Providing the computer-implemented services using at least the second inference model may include replacing the first inference model with the second inference model.

Each prompt of the set of prompts: may be a solicitation for a same information content; and may use a different phrasing from phrasings used by the other prompts of the set of prompts.

Inference models may be deemed to be correct when responses generated by the inference models to the set of prompts provide the same information content.

Obtaining the set of prompts may include: obtaining a set of potential prompts that includes one or more potential prompts, the one or more potential prompts being candidate members of a set of prompts and the set of prompts being usable to test whether the second inference model is at least internally consistent; performing, using the first inference model and the set of potential prompts, a second agreement testing process to obtain second levels of agreement; making a determination regarding whether the second levels of agreement meet criteria; in a first instance of the determination in which the second levels of agreement meet the criteria: promoting the one or more potential prompts to members of the set of prompts, and in a second instance of the determination in which the second levels of agreement do not meet the criteria: performing an action set to remediate the set of potential prompts.

The first inference model may be a first large language model (LLM) and the second inference model may be a second LLM.

The second inference model may be a generative artificial intelligence (AI) model hosted by a remote resource.

The set of prompts may be obtained using a local resource.

The local resource may be owned by a first owner and the remote resource may be owned by a second owner.

The remote resource may not be controlled by the first owner.

In an embodiment, a non-transitory media is provided. The non-transitory media may include instructions that when executed by a processor cause the computer-implemented method to be performed.

In an embodiment, a data processing system is provided. The data processing system may include the non-transitory media and a processor, and may perform the method when the computer instructions are executed by the processor.

Turning to FIG. 1, a block diagram illustrating a system in accordance with an embodiment is shown. The system shown in FIG. 1 may provide computer-implemented services. The computer-implemented services may include any type and quantity of computer-implemented services. For example, the computer-implemented services may include data storage services, instant messaging services, database services, data generation services, and/or any other type of service that may be implemented with a computing device. The computer-implemented services may be provided, at least in part, using inference models and/or inferences (e.g., responses) obtained using the inference models.

To provide the computer-implemented services, the inference models may be trained, using training data, to generate responses when provided with a prompt (e.g., ingest data). The inference models may include generative artificial intelligence (AI) inference models (e.g., large language models (LLMs)); therefore, the responses may include new instances of data created by the generative AI inference models based on learned associations from and/or an understanding of the training data. For example, the inference models may be trained using unstructured data, such as stories, essays, audio transcription, video description, and/or other types of human interpretable text, to generate responses of the same. The responses may be provided to downstream consumers as a computer-implemented service and/or may be used to otherwise facilitate computer-implemented services provided to the downstream consumers.

However, the inference models may be hosted (e.g., operated) by a remote resource (e.g., a third-party entity) and may not be controlled by the entity providing the prompts for the inference model (e.g., a local resource). The local resource may be owned by a first owner and the remote resource may be owned by a second owner. In addition, the first owner may not control the remote resource. Therefore, to utilize inferencing services provided by the remote resource, the local resource may provide prompts to be ingested by the inference model and responses generated by the inference model may be obtained in response. The responses may be provided to downstream consumers as computer-implemented services and/or may be utilized to facilitate the computer-implemented services. Therefore, information about the inference models (e.g., how the inference models are trained, tests used to evaluate internal consistency and/or correctness of the inference models) may be unknown and/or unavailable (e.g., to the local resource, to the first owner).

Consequently, an evaluation process may be performed (e.g., by the local resource, by the first owner, by another entity trusted by the first owner) to determine whether an inference model hosted by the remote resource generates responses that meet needs of a downstream consumer (and/or that otherwise meet criteria for use in the computer-implemented services). During the evaluation process, prompts may be provided to the inference model (e.g., via the remote resource) and responses generated by the inference model using the prompts may be obtained in response. The responses may be evaluated (e.g., by a subject matter expert (SME)) to determine whether the inference model is sufficiently internally consistent and/or correct for use in providing the computer-implemented services (e.g., using any criteria for internal consistency and/or correctness).

However, to evaluate an internal consistency and/or correctness of a generative AI model (a generative AI inference model), the process of providing prompts and evaluating responses may be repeated any number of times until the local resource (and/or another entity) determines whether the inference model is approved for use in providing the computer-implemented services. Doing so may consume an undesirable quantity of resources (e.g., computational resources, time resources, cognitive resources of the SME). In addition, the inference model may be updated over time (e.g., may be replaced with a new inference model, may be at least partially modified). Following an update to the inference model, the evaluation process may be repeated (e.g., by the local resource) thereby consuming additional resources that may otherwise be allocated to providing the computer-implemented services. Consequently, the computer-implemented services may be delayed, interrupted, and/or may otherwise be negatively impacted.

In general, embodiments disclosed herein may provide methods, systems, and/or devices for managing inference models in a manner that increases a likelihood of providing the desired computer-implemented services. To do so, a first inference model may be used to evaluate an internal consistency and/or correctness of a second inference model. The first inference model may be a first generative AI model (e.g., a first large language model (LLM)) that is deemed internally consistent and correct and the second inference model may be a second generative AI model (e.g., a second LLM) for which an internal consistency and/or a correctness is unknown. Therefore, the first inference model may be trusted for use in evaluating the second inference model.

To do so, a set of prompts may be obtained (e.g., from a SME, from a third inference model), the set of prompts having been previously deemed consistent. The set of prompts may be provided to the second inference model (e.g., via the remote resource). Each prompt of the set of prompts may be intended to elicit a response with a same information content and may have a different phrasing from phrasings of other prompts of the set of prompts. A first set of responses generated by the second inference model may be obtained from the remote resource, each response of the first set of responses being responsive to a prompt of the set of prompts.

The first inference model may be prompted to evaluate agreement between the first set of responses. An output from the first inference model may be used, at least in part, to obtain a level of agreement between the responses. The level of agreement may be compared to criteria and if the criteria are met, it may be concluded that an internal consistency of the second inference model may be acceptable (e.g., may be sufficiently internally consistent to be utilized to provide the computer-implemented services). If the criteria are not met, it may be concluded that the internal consistency of the second inference model may not be acceptable.

In addition to determining that the second inference model is internally consistent, it may be determined whether the second inference model is correct. To do so, an inter-inference model consistency test may be performed. During the inter-inference model consistency test, a second set of responses may be obtained, the second set of responses being generated by the first inference model using the set of prompts. As the first inference model was deemed correct when generating the second set of responses, the second set of responses may also be deemed correct.

The first set of responses (e.g., generated by the second inference model) may have a first same information content and the second set of responses may have a second same information content. The first same information content and the second same information content may be compared (e.g., via prompting the first inference model to perform the comparison) to obtain a level of similarity between the first same information content and the second same information content. The level of similarity may be compared to a level of similarity threshold and, if the level of similarity meets the level of similarity threshold, it may be concluded that the second inference model is consistent with the first inference model and, therefore, is correct. If the level of similarity does not meet the level of similarity threshold, it may be concluded that the second inference model is not consistent with the first inference model and, therefore, is not correct. If the second inference model is deemed correct, computer-implemented services may be provided using at least the second inference model. If the second inference model is not deemed correct, the second inference model may be provisionally rejected for use in providing the computer-implemented services.

By doing so, embodiments disclosed herein may improve processes of evaluating an internal consistency and/or a correctness of inference models so that responses generated by the inference models may have an increased likelihood of being trustworthy for use in providing computer-implemented services to downstream consumers. The system may do so by evaluating an internal consistency and/or a correctness of an inference model using a trusted inference model (e.g., an inference model deemed internally consistent and correct) thereby reducing resource expenditure during inference model evaluation.

To provide the above noted functionality, the system of FIG. 1 may include downstream consumers 100, local resource 102, remote resource 106, and communication system 104. Each of these components is discussed below.

Downstream consumers 100 may provide and/or consume all, or a portion of, the computer-implemented services. Downstream consumers 100 may include any number of downstream consumers (e.g., 100A, 100N) and may include, for example, businesses, individuals, and/or devices (e.g., data processing systems) that may obtain responses and/or other information based on the responses as part of receiving the computer-implemented services.

Downstream consumers 100 may subscribe to computer-implemented services provided, at least in part, by local resource 102 and local resource 102 may interact with any number of other entities (e.g., remote resource 106) as part of providing the computer-implemented services. For example, remote resource 106 may provide inferencing services to local resource 102 and local resource 102 may use inferences (e.g., responses) generated by inference models hosted by remote resource 106 as part of the computer-implemented services provided to downstream consumers 100.

Remote resource 106 may manage any number of inference models and may be owned by a second owner (e.g., a third-party entity). For example, remote resource 106 may train, and/or host (e.g., operate) generative AI models and may provide inferencing services to any number of other entities. However, the inference models (e.g., the generative AI models) may be trained and/or evaluated using methods that are not available to the other entities. Consequently, the other entities (e.g., local resource 102) may perform independent evaluation processes for the inference models prior to providing computer-implemented services based on responses received from remote resource 106.

Local resource 102 may include any entity that provides, at least in part, computer-implemented services to downstream consumers 100. Local resource 102 may be owned by a first owner and the first owner may not control remote resource 106. To provide its functionality, local resource 102 may: (i) perform inference model consistency testing processes to determine whether inference models are internally consistent, (ii) perform inter-inference model consistency test processes to determine whether inference models are correct, (iii) perform prompt agreement testing processes to determine whether sets of prompts are consistent, (iv) train and/or host any number of inference models, (v) obtain responses (e.g., inferences) from any number of inference models, (vi) use the responses as part of providing the computer-implemented services, and/or (vii) perform other actions.

During an inference model consistency test (e.g., an inference model consistency testing process), local resource 102 may: (i) obtain a set of prompts, the set of prompts being deemed consistent by a first inference model and being intended to elicit responses from a second inference model that have a same information content, (ii) obtain, using the set of prompts, a first set of responses from the second inference model, (iii) perform, using the first inference model and the first set of responses, an agreement testing process to obtain first levels of agreement, and/or (iv) compare the first levels of agreement to criteria to determine whether the first levels of agreement meet the criteria.

Figure 2A:
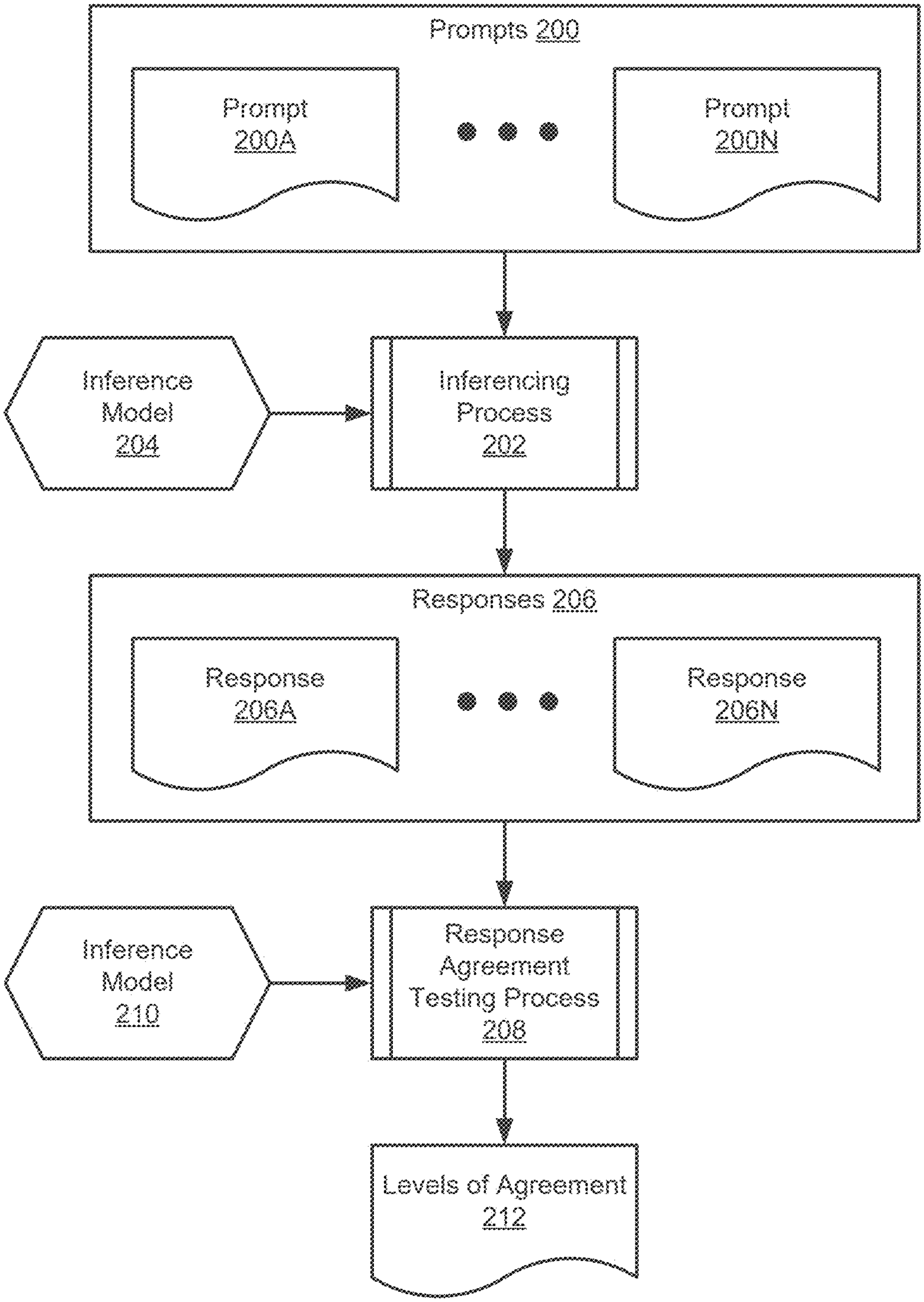
FIGS. 2A-2B show data flow diagrams illustrating an inference model consistency testing process in accordance with an embodiment.
Figure 2B:
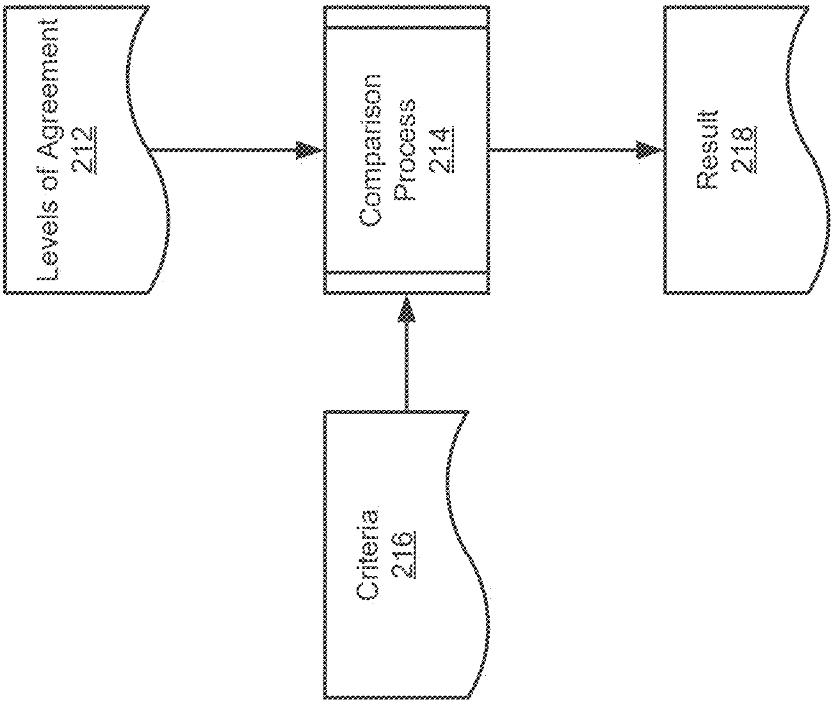

If the first levels of agreement meet the criteria, local resource 102 may conclude that an internal consistency of the second inference model is acceptable (e.g., for use in providing computer-implemented services). If the first levels of agreement do not meet the criteria, local resource 102 may conclude that the internal consistency of the second inference model is not acceptable and the second inference model may be provisionally rejected for use in providing computer-implemented services to downstream consumers. Refer to FIGS. 2A-2B for additional details regarding inference model consistency tests.

During an inter-inference model consistency test, local resource 102 may: (i) obtain a second set of responses, the second set of responses being generated by the first inference model using the set of prompts, (ii) compare a first same information content of the first set of responses to a second same information content of the second set of responses to obtain a level of similarity between the first same information content and the second same information content, and/or (iii) determine whether the level of similarity meets a level of similarity threshold. If the level of similarity meets the level of similarity threshold, local resource 102 may: (i) conclude that the second inference model is correct and/or (ii) provide computer-implemented services using at least the second inference model. If the level of similarity does not meet the level of similarity threshold, local resource 102 may provisionally reject the second inference model for use in providing the computer-implemented services. Refer to FIGS. 2D-2E for additional details regarding inter-inference model consistency tests.

When providing their functionality, any of (and/or components thereof) downstream consumers 100, local resource 102, and/or remote resource 106 may perform all, or a portion, of the actions and methods illustrated in FIGS. 2A-3C.

Any of (and/or components thereof) downstream consumers 100, local resource 102, and remote resource 106 may be implemented using a computing device (also referred to as a data processing system) such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to the discussion of FIG. 4.

Any of the components illustrated in FIG. 1 may be operably connected to each other (and/or components not illustrated) with communication system 104. In an embodiment, communication system 104 includes one or more networks that facilitate communication between any number of components. The networks may include wired networks and/or wireless networks (e.g., and/or the Internet). The networks may operate in accordance with any number and types of communication protocols (e.g., such as the internet protocol).

While illustrated in FIG. 1 as including a limited number of specific components, a system in accordance with an embodiment may include fewer, additional, and/or different components than those illustrated therein.

The system described in FIG. 1 may be used to manage inference models to improve availability and/or quality of computer-implemented services provided to downstream consumers of the computer-implemented services. The following processes described in FIGS. 2A-2E may be performed by the system in FIG. 1 when providing this functionality.

To further clarify embodiments disclosed herein, data flow diagrams in accordance with an embodiment are shown in FIGS. 2A-2E. In these diagrams, flows of data and processing of data are illustrated using different sets of shapes. A first set of shapes (e.g., 200A, 212, etc.) is used to represent data structures, a second set of shapes (e.g., 202, 208, etc.) is used to represent processes performed using and/or that generate data, and a third set of shapes (e.g., 204, 210) is used to represent inference models.

Turning to FIG. 2A, a first data flow diagram in accordance with an embodiment is shown. The first data flow diagram may illustrate data used in and data processing performed in obtaining first levels of agreement between a first set of responses generated by an inference model.

To obtain the first levels of agreement, inferencing process 202 may be performed using prompts 200. Prompts 200 may be obtained, for example, via: (i) performing a prompt agreement testing process using a set of potential prompts, (ii) generation by a SME, (iii) generation by a third inference model (not shown), and/or (iv) other methods. The third inference model (not shown) may also be a generative AI model (e.g., a third LLM). For additional details regarding the prompt agreement testing process, refer to the description of FIG. 2C.

Prompts 200 may be a set of prompts including any number of prompts (e.g., 200A-200N) for inference model 204 that may be intended to elicit responses from inference model 204 that have a same information content. Prompt 200A, for example, may include human-interpretable text and may include a question to be answered by inference model 204. Prompt 200A may: (i) include a solicitation for the same information content (e.g., as other prompts of prompts 200), and (ii) use a different phrasing from phrasings used by the other prompts of prompts 200.

For example, prompt 200A may include a solicitation (e.g., question) for inference model 204 to provide a set of instructions for resetting a password using a first phrasing. Prompt 200B may include a second solicitation for inference model 204 to provide the set of instructions for resetting the password (e.g., the same information content) using a second phrasing. The first phrasing may include human-interpretable text such as "I forgot my password" and the second phrasing may include human-interpretable text such as "I don't remember my password." Other prompts of prompts 200 may include other phrasings such as "I want to change my password," "How do I reset my password," etc. However, each prompt of prompts 200 may be intended to elicit the same information content that includes the set of instructions for resetting the password.

While described with respect to prompts 200 including a set of prompts (e.g., 200A-200N) intended to elicit responses with a same information content, it may be appreciated that prompts 200 may include any number of additional sets of prompts (not shown) that may be intended to elicit other information content without departing from embodiments disclosed herein. For example, prompts 200 may include a second set of prompts (not shown) intended to elicit a second same information content different from the same information content.

During inferencing process 202, prompts 200 may be provided to inference model 204. To provide prompts 200 to inference model 204, prompts 200 may be provided to a remote entity (e.g., a remote resource) that owns, hosts, and operates inference model 204. Inference model 204 may be a generative AI model (e.g., an LLM) trained to generate language, understand language, and/or otherwise process requests related to languages. The generative AI model may include, for example, a neural network inference model. Inference model 204 may be trained using large training datasets to learn statistical relationships within text. Inference model 204 may be trained, for example, to answer questions included in prompts 200.

However, prompts 200 may be obtained using a local resource. The local resource may be owned by a first owner and the remote resource may be owned by a second owner. The first owner may not control the remote resource (e.g., may not have knowledge of or an ability to modify operation of the remote resource) and, therefore, may not have knowledge of how inference model 204 was trained and/or evaluated for internal consistency and/or other performance metrics.

During inferencing process 202, the remote resource may feed prompts 200 into inference model 204 and may obtain responses 206 from inference model 204. Responses 206 may include any number of responses (e.g., 206A-206N). Each response of responses 206 may be responsive to a prompt of prompts 200. For example, response 206A may be responsive to prompt 200A. Responses 206 may be obtained from the remote resource (e.g., by the local resource, by the first owner) in response to prompts 200.

Responses 206 may include at least a first response (e.g., response 206A) with a first information content and a second response (e.g., response 206B) with a second information content. Continuing with the above example where prompts 200 may include requests for instructions to reset a password, the first information content and the second information content may be intended to include the instructions for resetting the password. Inference model 204 may be provided (e.g., as part of prompts 200, prior to inferencing process 202) with additional contextual information regarding password resetting, specific graphical user interfaces (GUIs), and/or other information to narrow a scope of responses 206 to an application relevant to the first owner (and/or the computer-implemented services provided by the first owner).

To evaluate agreement between responses of responses 206, response agreement testing process 208 may be performed. During response agreement testing process 208, responses 206 and inference model 210 may be used to obtain levels of agreement 212. To do so, a response agreement testing prompt (not shown) may be provided to inference model 210.

The response agreement testing prompt may include: (i) responses 206, (ii) instructions for comparing information content of responses 206, and/or (iii) other information such as contextual information usable to compare responses 206. For example, the response agreement testing prompt may instruct inference model 210 to: (i) determine whether at least response 206A and response 206B seem to be responsive to a same prompt (e.g., question), (ii) determine whether at least response 206A and response 206B seem to have a same information content, and/or (iii) otherwise compare responses 206.

Inference model 210 may include a second generative AI model (e.g., a second LLM) trained to generate language, understand language, and/or otherwise process requests related to languages. The second generative AI model may include, for example, a neural network inference model. Inference model 210 may be trained using large training datasets to learn statistical relationships within text. Inference model 210 may be trained, for example, to compare information content of data structures provided to as ingest (e.g., responses 206).

Inference model 210 may be trained, hosted, and operated locally (e.g., by the first owner, by the local resource, by an entity trusted by the first owner) and/or may be trained, hosted, and operated by the remote resource. However, an internal consistency and correctness of inference model 210 may have been previously evaluated and concluded to be acceptable (e.g., via any methods and using any criteria) prior to performing response agreement testing process 208.

For example, inference model 210 may be trained, using training data, to generate inferences (e.g., responses, outputs) when provided with a prompt (e.g., ingest data). Inference model 210 may include a second generative AI model (e.g., a second LLM); therefore, the inferences may include new instances of data created by the second generative AI model based on learned associations from and/or an understanding of the training data. For example, inference model 210 may be trained using unstructured data, such as stories, essays, audio transcription, video description, and/or other types of human interpretable text, to generate inferences of the same.

Following training of inference model 210, an internal consistency and correctness of inference model 210 may be evaluated using any method. For example, evaluation of the internal consistency of inference model 210 may be performed using methods similar to those described with respect to evaluating inference model 204 in FIGS. 2A-2B. In addition, evaluation of the correctness of inference model 210 may include methods similar to those described with respect to evaluating inference model 204 in FIGS. 2D-2E. The internal consistency and/or the correctness of inference model 210 may be evaluated via any other methods without departing from embodiments disclosed herein.

During response agreement testing process 208, an output may be obtained from inference model 210 in response to providing the response agreement testing prompt to inference model 210. The output may include levels of agreement 212 and/or may include information usable to obtain levels of agreement 212. For example, the information usable to obtain levels of agreement 212 may include: (i) a list of responses of responses 206 that inference model 210 considers as having a same information content, (ii) a list of prompts of prompts 200 that inference model 210 considers equivalent (e.g., via determining that responses to the prompts have a same information content), and/or (iii) other information. Therefore, during response agreement testing process 208, levels of agreement 212 may be obtained (e.g., by reading the levels of agreement from the output, by analyzing and/or processing the output to obtain the levels of agreement).

Levels of agreement 212 may indicate degrees of similarity between responses of responses 206 (e.g., between at least response 206A and response 206B). For example, levels of agreement 212 may include: (i) a number of responses 206 that inference model 210 considers equivalent (e.g., shown as a number and/or as a percentage), (ii) a number of responses 206 that inference model 210 considers to be answers to a same prompt (e.g., shown as a number and/or as a percentage), and/or (iii) other quantifications of the degree of similarity.

In addition, the output from inference model 210 may be used to evaluate prompts 200 (not shown). By doing so, it may be determined whether prompts 200 may be modified. Prompts 200 may be modified, for example, if a first prompt from a first set of prompts (e.g., including solicitations for a first information content) is considered equivalent (e.g., by inference model 210) to a second prompt from a second set of prompts (e.g., including solicitations for a second information content) of prompts 200. The first prompt may be considered equivalent to the second prompt: (i) if inference model 210 determines that the first prompt and the second prompt seem to elicit same information content, (ii) if responses to the first prompt and the second prompt respectively seem to be responses to a same question, (iii) and/or based on other rules for prompt evaluation.

Thus, by implementing the data flow shown in FIG. 2A, a system in accordance with embodiments disclosed herein may be used to obtain levels of agreement between responses generated by an inference model. By obtaining the levels of agreement using a trusted second inference model, a resource cost (e.g., computational resources, time resources, cognitive resources) of evaluating an internal consistency of the inference model may be reduced.

Turning to FIG. 2B, a second data flow diagram in accordance with an embodiment is shown. The second data flow diagram may illustrate data used in and data processing performed in concluding whether an internal consistency of an inference model is acceptable.

To conclude whether the internal consistency of the inference model is acceptable, comparison process 214 may be performed. During comparison process 214, it may be determined whether levels of agreement 212 (e.g., described in FIG. 2A) meets criteria 216. Criteria 216 may be provided by a downstream consumer, a SME, and/or any other entity participating in management of inference models. Criteria 216 may include any number of thresholds, rule sets, and/or other means of determining whether degrees of similarity between responses 206 indicated by levels of agreement 212 is considered acceptable.

For example, criteria 216 may include: (i) a threshold number and/or percentage of responses (e.g., 206) that inference model 210 considers equivalent, (ii) a threshold number of responses 206 that inference model 210 considers to be answers to a same prompt, and/or (iii) other thresholds.

If a quantity included in levels of agreement 212 meets a corresponding threshold of criteria 216, it may be concluded that an internal consistency of inference model 204 is acceptable. If the quantity included in levels of agreement 212 does not meet the corresponding threshold of criteria 216, it may be concluded that the internal consistency of inference model 204 is not acceptable. For example, levels of agreement 212 may indicate that 81% of responses 206 are considered to have a same information content and criteria 216 may include a threshold quantity of 75% of responses having the same information content. Therefore, in this example, levels of agreement 212 may meet criteria 216.

While described above with respect to a single quantity and a single corresponding threshold, it may be appreciated that any number of quantities may be compared to any number of corresponding thresholds and/or any other types of rules may be applied to determine whether criteria 216 are met.

As a result of comparison process 214, result 218 may be obtained. Result 218 may include an indication of whether the consistency of inference model 204 is concluded to be acceptable. For example, result 218 may include a "yes" or "no" answer, may include any quantities of levels of agreement 212, and/or may include other information.

In addition, while described in FIGS. 2A-2B as obtaining levels of agreement 212 from inference model 210 and performing comparison process 214 using levels of agreement 212 and criteria 216, it may be appreciated that inference model 210 may also perform at least a portion of comparison process 214 and an output from inference model 210 may include a determination of whether inference model 204 has an internal consistency that is considered acceptable.

Following obtaining result 218 (and/or at other times such as prior to performing comparison process 214), additional testing processes may be performed to further interrogate responses of responses 206 that were determined to not be equivalent during response agreement testing process 208. For example, a first response (e.g., response 206A) and a second response (e.g., response 206B) may be determined to not be equivalent by inference model 210. In response, inference model 210 may be prompted to explain a difference between response 206A and response 206B. Inference model 210 may generate a second output and the second output may include a description of the difference between response 206A and response 206B as determined by inference model 210. The second output may be evaluated (e.g., by an SME, by another entity, by a different inference model) to determine whether to retain or change a status of response 206A and response 206B being non-equivalent.

Figure 2C:
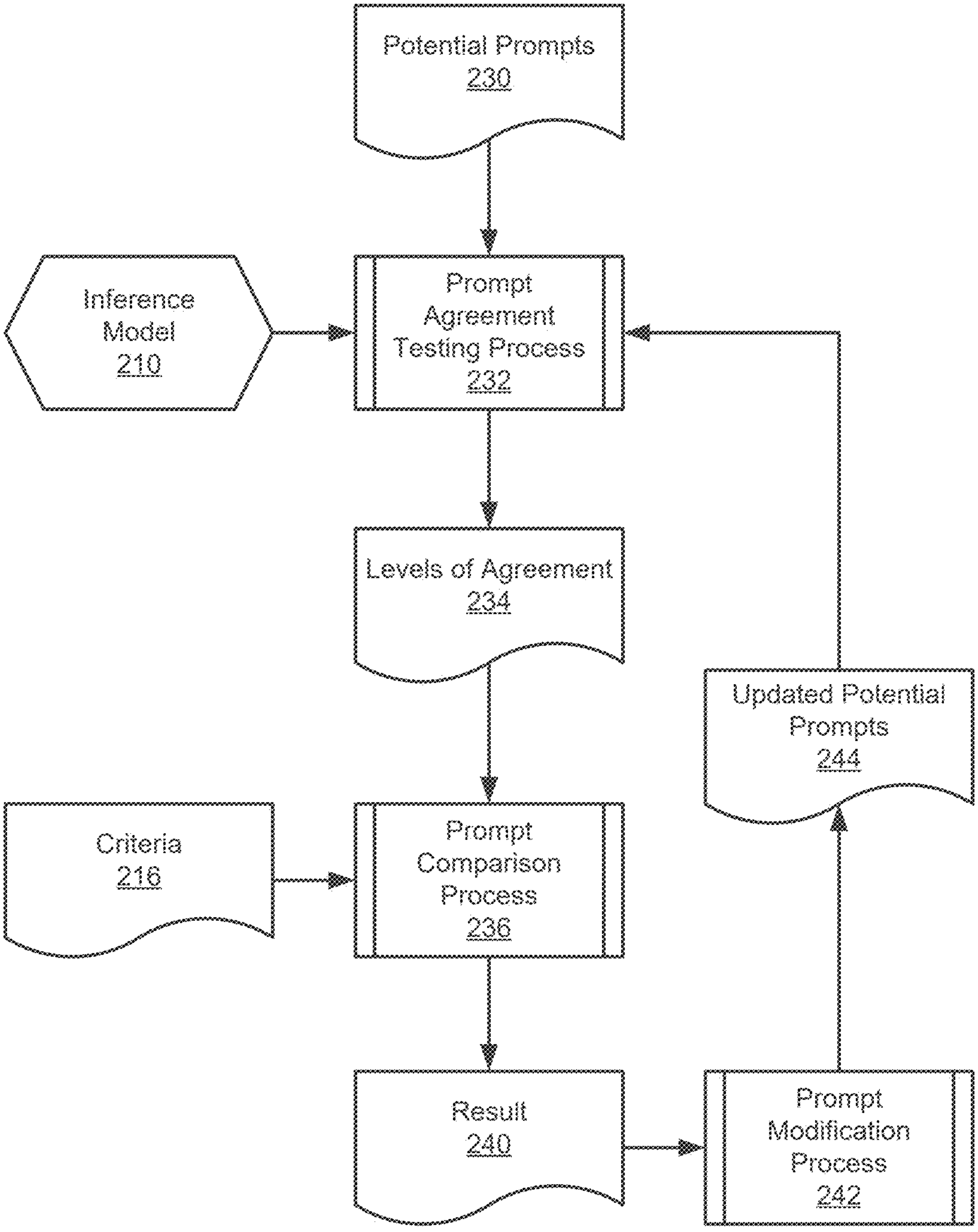
FIG. 2C shows a data flow diagram illustrating a prompt consistency testing process in accordance with an embodiment.
Figure 2D:
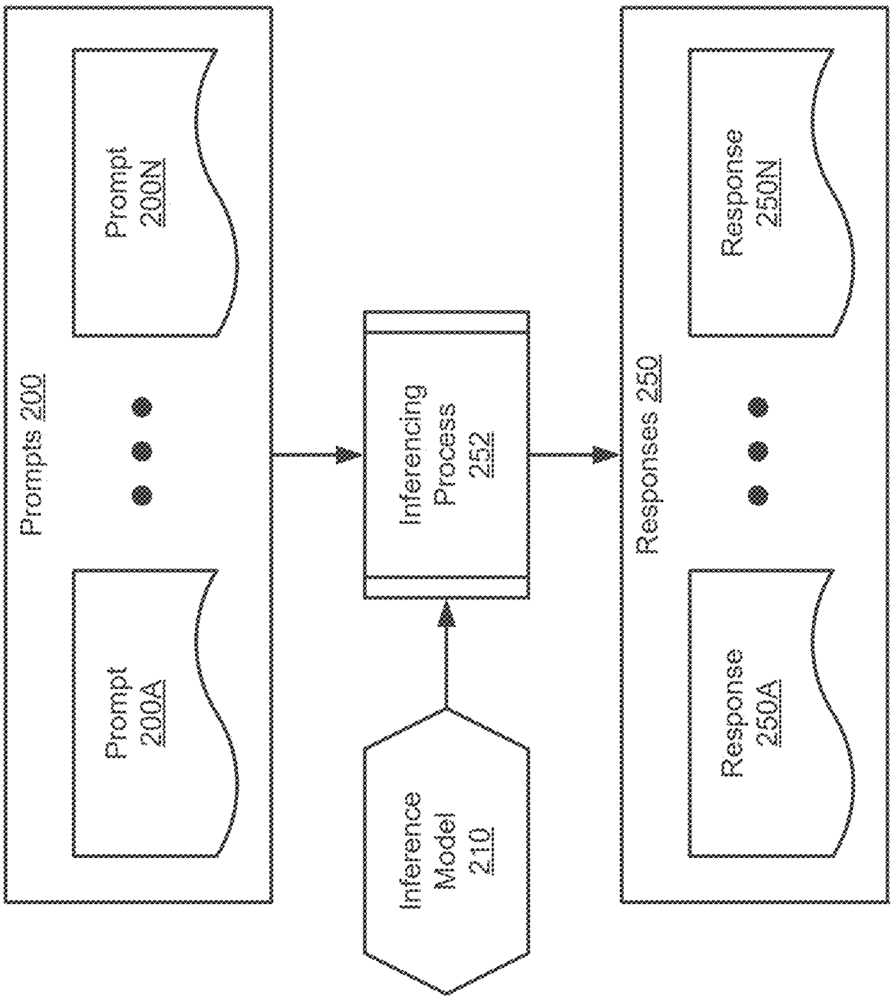
FIGS. 2D-2E shows a data flow diagram illustrating an inter-inference model consistency testing process in accordance with an embodiment.
Figure 2E:
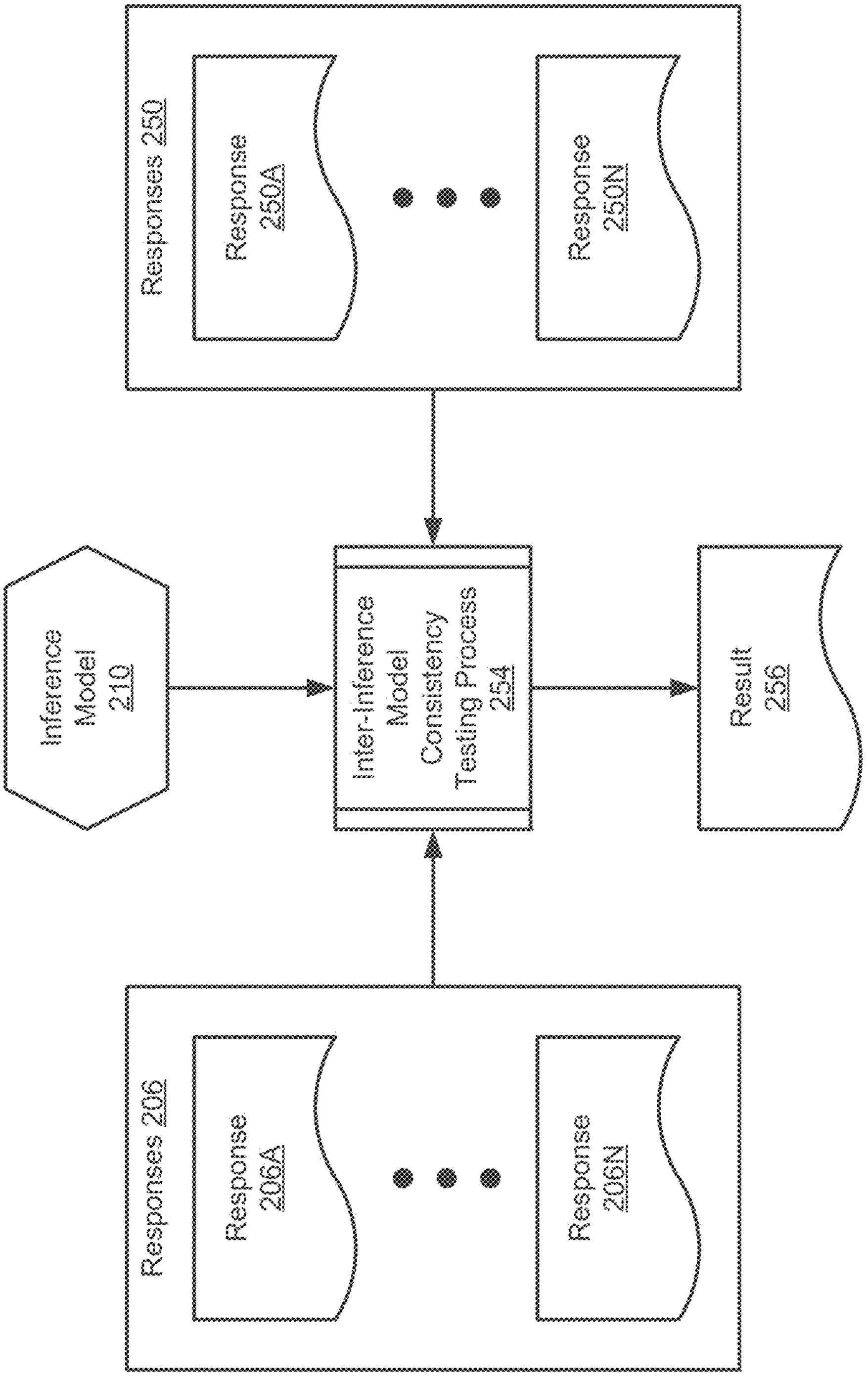

Turning to FIG. 2C, a third data flow diagram in accordance with an embodiment is shown. The third data flow diagram may illustrate data used in and data processing performed in obtaining a set of prompts (e.g., prompts 200 shown in FIG. 2A) usable to test whether an internal consistency and/or a correctness of an inference model (e.g., hosted by a remote resource) is acceptable. The processes illustrated in FIG. 2C may be performed prior to performing the processes described in FIGS. 2A-2B.

The set of prompts may be obtained to test whether the internal consistency and/or correctness of an inference model (e.g., inference model 204, not shown) is acceptable. To do so, each prompt of the set of prompts may elicit a response including a same information content. However, the set of prompts may include at least one prompt which is inconsistent with other prompts of the set of prompts, non-specific, poorly worded, and/or otherwise erroneous such that the at least one prompt may not elicit a response with the same information content as other prompts of the set of prompts. As a result, the set of prompts may have a reduced likelihood of evaluating the internal consistency and/or the correctness of the inference model as desired (e.g., by a consumer of the inferences).

To improve the likelihood that the set of prompts evaluates the internal consistency and/or the correctness of the inference model as desired, prompt agreement testing process 232 may be performed. To perform prompt agreement testing process 232, a set of potential prompts (e.g., potential prompts 230) may be obtained. Potential prompts 230 may include one or more potential prompts, the one or more potential prompts being candidate members of the set of prompts and being intended to elicit responses that have a same information content. Potential prompts 230 may be obtained, for example, via generation by a SME, generation by a third inference model (not shown), and/or via other methods. The third inference model (not shown) may also be a generative AI model (e.g., a third LLM).

For example, potential prompts 230 may include a solicitation for the inference model to provide a set of instructions for baking a cake. Potential prompts 230 may include prompts using phrasings that vary in length, specificity, and/or other characteristics. For example, potential prompts 230 may include potential prompts directly requesting the instructions, such as "how do I bake a cake," "give me a recipe for baking a cake," etc. Potential prompts 230 may also include potential prompts which are vague and/or non-specific (e.g., "baking a cake," "how to bake"), do not elicit a same information content as other prompts in the set of prompts (e.g., "how do I bake cookies"), and/or contain errors (e.g., spelling errors, grammatical errors).

Prompt agreement testing process 232 may be performed using potential prompts 230 and inference model 210, which may be hosted by a local resource, may be hosted by the remote resource, and may exhibit an internal consistency and correctness which is acceptable while prompt agreement testing process 232 is performed (e.g., inference model 210 may be internally consistent and correct). Refer to the description of FIG. 2A for additional details regarding inference model 210. While described in FIG. 2C as utilizing inference model 210 to perform at least prompt agreement testing process 232, it may be appreciated that another inference model (e.g., another generative AI model) that is internally consistent and correct may be used without departing from embodiments disclosed herein.

During prompt agreement testing process 232, potential prompts 230 may be provided to inference model 210. Potential prompts 230 may be provided to inference model 210 by feeding potential prompts 230 into inference model 210 (e.g., by the local resource, via the remote resource), and a second set of responses may be obtained as output. Each response of the second set of responses may include an information content responsive to a potential prompt of potential prompts 230.

To evaluate agreement between responses of the second set of responses, an information content of each response of the second set of responses may be compared (e.g., by inference model 210) to obtain levels of agreement (e.g., levels of agreement 234). Levels of agreement 234 may indicate degrees of similarity between the information content of each response of the second set of responses. Levels of agreement 234 may be obtained using methods similar to those described with respect to response agreement testing process 208 in FIG. 2A (e.g., prompting inference model 210 to compare an information content from each response of the second set of responses, obtaining levels of agreement 234 and/or information usable to obtain levels of agreement 234 as output) and may include information similar to that of levels of agreement 212. Refer to the description of FIG. 2A for additional details regarding the levels of agreement.

Continuing with the above example, potential prompts 230 may include 100 potential prompts, each intending to solicit instructions for baking a cake. The 100 potential prompts may be fed to inference model 210, which may generate 100 responses as output. The 100 responses may vary in organization (e.g., a numbered list of steps, a paragraph), length (e.g., different amounts of text generated as output), specificity (e.g., instructions for baking a specific type of cake, instructions for baking cake in general), detail, content, and/or characteristics. The 100 responses may be fed back into inference model 210, which may be prompted to evaluate the degree of similarity between each of the responses to obtain levels of agreement 234. For example, to obtain levels of agreement 234, inference model 210 may assign each response a "yes" or "no" designation based on whether the response includes the instructions for baking the cake. Inference model 210 may assign 90 responses the "yes" designation and 10 responses the "no" designation (e.g., 90% of the responses contain the same information content).

Levels of agreement 234 may be used to perform prompt comparison process 236 to determine whether potential prompts 230 may be used to evaluate the internal consistency and/or the correctness of an inference model as desired. During prompt comparison process 236, it may be determined whether levels of agreement 234 meets criteria 216 (e.g., described in FIG. 2B). Prompt comparison process 236 may be performed by inference model 210 using methods similar to those described with respect to comparison process 214 in FIG. 2B. Refer to the description of FIG. 2B for additional details regarding making a determination regarding whether the levels of agreement meet criteria.

Continuing with the above example, levels of agreement 234 may indicate 90% of the responses include the same information content (e.g., instructions for baking a cake). Levels of agreement 234 may be compared to criteria 216, which may include a threshold quantity of responses with the same information content. Responses may be considered to have a same information content, for example, based on an extent to which inference model 210 considers the responses to be responsive to a same prompt (e.g., question). For example, criteria 216 may include a threshold quantity of 95% of responses having the same information content. Therefore, in this example, levels of agreement 234 may not meet criteria 216.

As a result of prompt comparison process 236, result 240 may be obtained. Result 240 may include an indication of whether potential prompts 230 meet the criteria to be used to evaluate the internal consistency and/or the correctness of an inference model as desired. For example, result 240 may include: (i) a "yes" or "no" answer, (ii) a ratio and/or percentage of prompts which elicit responses with the same information content, (iii) a list of prompts which do not elicit responses with the same information content, (iv) a list of prompts which elicit responses with the same information content, (v) any quantities of levels of agreement 234, and/or (v) other information.

If result 240 indicates levels of agreement 234 meets criteria 216, the one or more potential prompts included in potential prompts 230 may be promoted to members of the set of prompts (e.g., prompts 200, not shown). After the one or more potential prompts are promoted to members of the set of prompts, the set of prompts may be used to determine whether the internal consistency and/or correctness of an inference model is acceptable (e.g., inference model 204, not shown). Refer to the discussion of FIGS. 2A-2B for additional details regarding using the set of prompts to evaluate the internal consistency of the inference model. Refer to the discussion of FIGS. 2D-2E for additional details regarding using the set of prompts to evaluate the correctness of the inference model.

If result 240 indicates levels of agreement 234 does not meet criteria 216, an action set may be performed to remediate potential prompts 230. As part of performing the action set, prompt modification process 242 may be performed. During prompt modification process 242, potential prompts 230 may be modified to obtain an updated set of potential prompts (e.g., updated potential prompts 244). Updated potential prompts 244 may include one or more updated potential prompts.

Modifying potential prompts 230 may include removing at least one potential prompt from potential prompts 230, the at least one potential prompt exhibiting a level of agreement of levels of agreement 234 that does not meet criteria 216. Continuing with the above example, potential prompts 230 may be modified by removing the 10 prompts which elicit the responses which were assigned the "no" designation. As a result, updated potential prompts 244 may include the 90 prompts which elicit the responses which were assigned the "yes" designation.

Modifying potential prompts 230 may also include identifying, by inference model 210, at least one potential prompt from potential prompts 230 that exhibits a level of agreement of levels of agreement 234 that does not meet the criteria, and prompting inference model 210 to modify the at least one potential prompt. The at least one potential prompt may be modified to increase a likelihood that the at least one potential prompt elicits a response with an updated level of agreement that meets criteria 216.

To modify the at least one potential prompt, inference model 210 may (i) identify a cause for the at least one prompt eliciting a response with a level of agreement that does not meet criteria 216 (e.g., by analyzing syntax, word choice, information content included in the at least one prompt, and/or other characteristics of the at least one prompt), and/or (ii) update the at least one prompt based on the identified cause (e.g., replace words, add and/or remove information content). Inference model 210 may also add additional prompts to potential prompts 230 to address the identified cause.

Continuing with the above example, inference model 210 may be used to identify a cause for the 10 prompts of potential prompts 230 eliciting responses with levels of agreement that do not meet criteria 216. For example, a first prompt may include a misspelling of the word "cake," a second prompt may have replaced "cake" with "cookies," a third prompt may be determined to be non-specific, etc. Based on the identified cause, inference model 210 may modify each of the 10 prompts to obtain updated potential prompts 244. Updated potential prompts 244 may include the 10 modified prompts and the 90 prompts which were not modified.

Upon modifying potential prompts 230 to obtain updated potential prompts 244, a second prompt agreement testing process may be performed to obtain updated levels of agreement (e.g., using methods similar to those described with respect to prompt agreement testing process 232). Inference model 210 may determine whether the updated levels of agreement meet criteria 216. If the updated levels of agreement meet criteria 216, the one or more updated potential prompts may be promoted to members of the set of prompts and the set of prompts may be used to determine whether the internal consistency and/or the correctness of the inference model is acceptable.

If the updated levels of agreement do not meet criteria 216, an action set may be performed to remediate the updated set of potential prompts. Performing the action set may include performing a second prompt modification process similar to prompt modification process 242. The updated set of potential prompts may continue to be modified until the updated levels of agreement meet criteria 216 and/or may be modified a predetermined number of times. For example, after being modified a predetermined number of times, if criteria 216 is not met, it may be determined that all or a portion of potential prompts 230 are not to be used to evaluate the consistency of the inference model.

Thus, by implementing the data flow shown in FIG. 2C, a system in accordance with embodiments disclosed herein may be used to obtain a set of prompts usable to test whether an internal consistency and/or a correctness of an inference model is acceptable. The set of prompts may be obtained by performing a prompt agreement testing process using a set of potential prompts to obtain levels of agreement, and making a determination regarding whether the levels of agreement meet criteria. If the levels of agreement meet criteria, one or more potential prompts of the set of potential prompts may be promoted to members of the set of prompts. If the levels of agreement do not meet criteria, at least one potential prompt of the set of potential prompts may be modified.

Turning to FIG. 2D, a fourth data flow diagram in accordance with an embodiment is shown. The fourth data flow diagram may illustrate data used in and data processing performed in obtaining a second set of responses (e.g., responses 250) from an inference model that is internally consistent and correct, the second set of responses being usable to perform an inter-inference model consistency test.

To obtain responses 250, inferencing process 252 may be performed. Inferencing process 252 may be similar to inferencing process 202 described in FIG. 2A. For example, during inferencing process 252, prompts 200 may be provided to inference model 210 (e.g., by the local resource, via the remote resource). For example, to provide prompts 200 to inference model 210, prompts 200 may be provided to a remote entity (e.g., a remote resource) that owns, hosts, and/or operates inference model 210.

During inferencing process 202, prompts 200 may be fed into inference model 210 and responses 250 may be obtained from inference model 210. Responses 250 may include any number of responses (e.g., 250A-250N). Each response of responses 250 may be responsive to a prompt of prompts 200. For example, response 250A may be responsive to prompt 200A. Responses 250 may be obtained from the remote resource (e.g., by the local resource, by the first owner) in response to prompts 200.

Each prompt of prompts 200 may: (i) include a solicitation for a same information content, and (ii) use a different phrasing from phrasings used by the other prompts of prompts 200. Therefore, inference model 210 may be deemed correct when responses 250 provide the same information content (e.g., that was solicited by prompts 200). For example, prompt 200A may include human-interpretable text that states: "what is the capital of Illinois?" Response 250A may include human-interpretable text that states: "Springfield, Illinois." Therefore, the information content of response 250A may be deemed correct.

Turning to FIG. 2E, a fifth data flow diagram in accordance with an embodiment is shown. The fifth data flow diagram may illustrate data used in and data processing performed in performing an inter-inference model consistency testing process to determine whether an inference model is correct.

To determine whether inference model 204 is correct, inter-inference model consistency testing process 254 may be performed. During inter-inference model consistency testing process 254, a first same information content of responses 206 (generated by inference model 204) may be compared to a second same information content of responses 250 (generated by inference model 210). As inference model 210 was deemed correct when responses 250 were generated, the second same information content of responses 250 may be considered correct. Therefore, if the first same information content and the second same information content are similar to a degree considered acceptable (e.g., based on a threshold and/or other rules), responses 206 may also be considered correct. If responses 206 are considered correct, it may be concluded that inference model 204 is correct (e.g., is sufficiently correct for use in providing the computer-implemented services).

To do so, inference model 210 may be prompted to compare the first same information content and the second same information content by feeding at least responses 206 and responses 250 into inference model 210 (e.g., by a local resource, via a remote resource). For example, a level of similarity prompt may be provided to inference model 210 (not shown) and the level of similarity prompt may instruct inference model 210 to: (i) determine whether responses 206 and responses 250 seem to be responsive to same prompts (e.g., questions), (ii) determine whether responses 206 and responses 250 seem to have a same information content, and/or (iii) otherwise compare responses 206 to responses 250.

During inter-inference model consistency testing process 254, an output may be obtained from inference model 210 in response to providing the level of similarity prompt to inference model 210. The output may include a level of similarity between the first same information content and the second same information content (not shown) and/or may include information usable to obtain the level of similarity.

For example, the information usable to obtain the level of similarity may include a list of responses of responses 206 that inference model 210 considers as having a same information content as responses 250 and/or other information. The level of similarity may indicate an extent to which the first same information content matches the second same information content.

For example, the level of similarity may include: (i) a number of responses 206 that inference model 210 considers consistent (e.g., considers as having a same information content) with responses 250 (e.g., shown as a number and/or as a percentage), (ii) a number of responses 206 that inference model 210 considers to be answers to a same prompt (e.g., shown as a number and/or as a percentage) as responses 250, and/or (iii) other quantifications of the level of similarity.

During inter-inference model consistency testing process 254, the level of similarity (not shown) may be compared to a level of similarity threshold (not shown). The level of similarity threshold may be based on any criteria for correctness of an inference model and may be obtained from: (i) a SME, (ii) a downstream consumer, (iii) another inference model, (iv) the first owner (e.g., of the local resource), and/or (v) from any other entity and/or source.

For example, the level of similarity may include a percentage indicating an extent to which the first same information content (e.g., of responses 206) is considered consistent with the second same information content (e.g., of responses 250). The level of similarity may, therefore, indicate that the first same information content is 78% similar to the second same information content. The level of similarity threshold may indicate that the first same information content must be considered to be at least 85% similar to the second same information content for inference model 204 to be considered consistent with inference model 210 and, therefore, to be deemed correct. Consequently, in this example, inference model 204 may not be deemed correct.

As a result of inter-inference model consistency testing process 254, result 256 may be obtained. Result 256 may include a "yes" or "no" designation regarding whether inference model 204 is deemed correct based on the comparison between the level of similarity and the level of similarity threshold.

If result 256 indicates that inference model 204 is correct, computer-implemented services may be provided using at least inference model 204. Doing so may include replacing inference model 210 for at least a portion of providing the computer-implemented services. Replacing inference model 210 with inference model 204 may include sending prompts to inference model 204 rather than sending prompts to inference model 210 and using responses generated by inference model 204 as part of providing the computer-implemented services.

If result 256 indicates that inference model 204 is not correct, inference model 204 may be provisionally rejected for use in providing the computer-implemented services. Provisionally rejecting inference model 204 may include labeling inference model 204 for additional training to increase a likelihood that inference model 204 may be deemed correct in the future and/or other processes.

Thus, by implementing the data flow shown in FIGS. 2D-2E, a system in accordance with embodiments disclosed herein may be used to test whether a correctness of an inference model is acceptable. By utilizing a trusted inference model deemed internally consistent and correct during the process of testing for correctness, resources may be conserved while determining whether an inference model is sufficiently correct to be used in providing computer-implemented services. Consequently, resources may be allocated to providing the computer-implemented services and a likelihood that the computer-implemented services may be provided as desired to downstream consumers may be increased.

Any of the processes illustrated using the second set of shapes may be performed, in part or whole, by digital processors (e.g., central processors, processor cores, etc.) that execute corresponding instructions (e.g., computer code/software). Execution of the instructions may cause the digital processors to initiate performance of the processes. Any portions of the processes may be performed by the digital processors and/or other devices. For example, executing the instructions may cause the digital processors to perform actions that directly contribute to performance of the processes, and/or indirectly contribute to performance of the processes by causing (e.g., initiating) other hardware components to perform actions that directly contribute to the performance of the processes.

Any of the processes illustrated using the second set of shapes may be performed, in part or whole, by special purpose hardware components such as digital signal processors, application specific integrated circuits, programmable gate arrays, graphics processing units, data processing units, and/or other types of hardware components. These special purpose hardware components may include circuitry and/or semiconductor devices adapted to perform the processes. For example, any of the special purpose hardware components may be implemented using complementary metal-oxide semiconductor-based devices (e.g., computer chips).

Any of the data structures illustrated using the first and third set of shapes may be implemented using any type and number of data structures. Additionally, while described as including particular information, it will be appreciated that any of the data structures may include additional, less, and/or different information from that described above. The informational content of any of the data structures may be divided across any number of data structures, may be integrated with other types of information, and/or may be stored in any location.

Figure 3A:
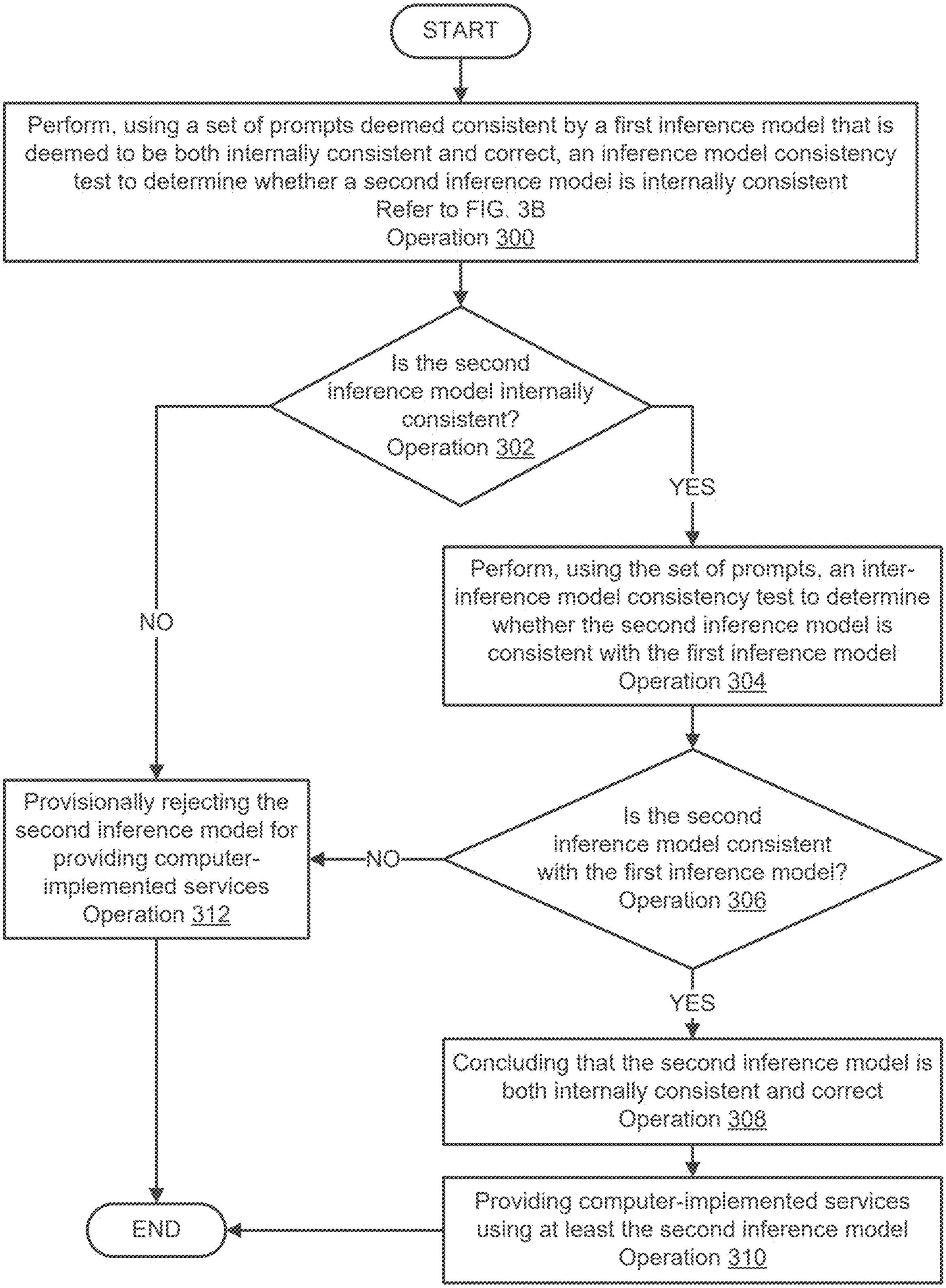
FIG. 3A shows a flow diagram illustrating a method of testing whether an inference model is both internally consistent and correct in accordance with an embodiment.
Figure 3B:
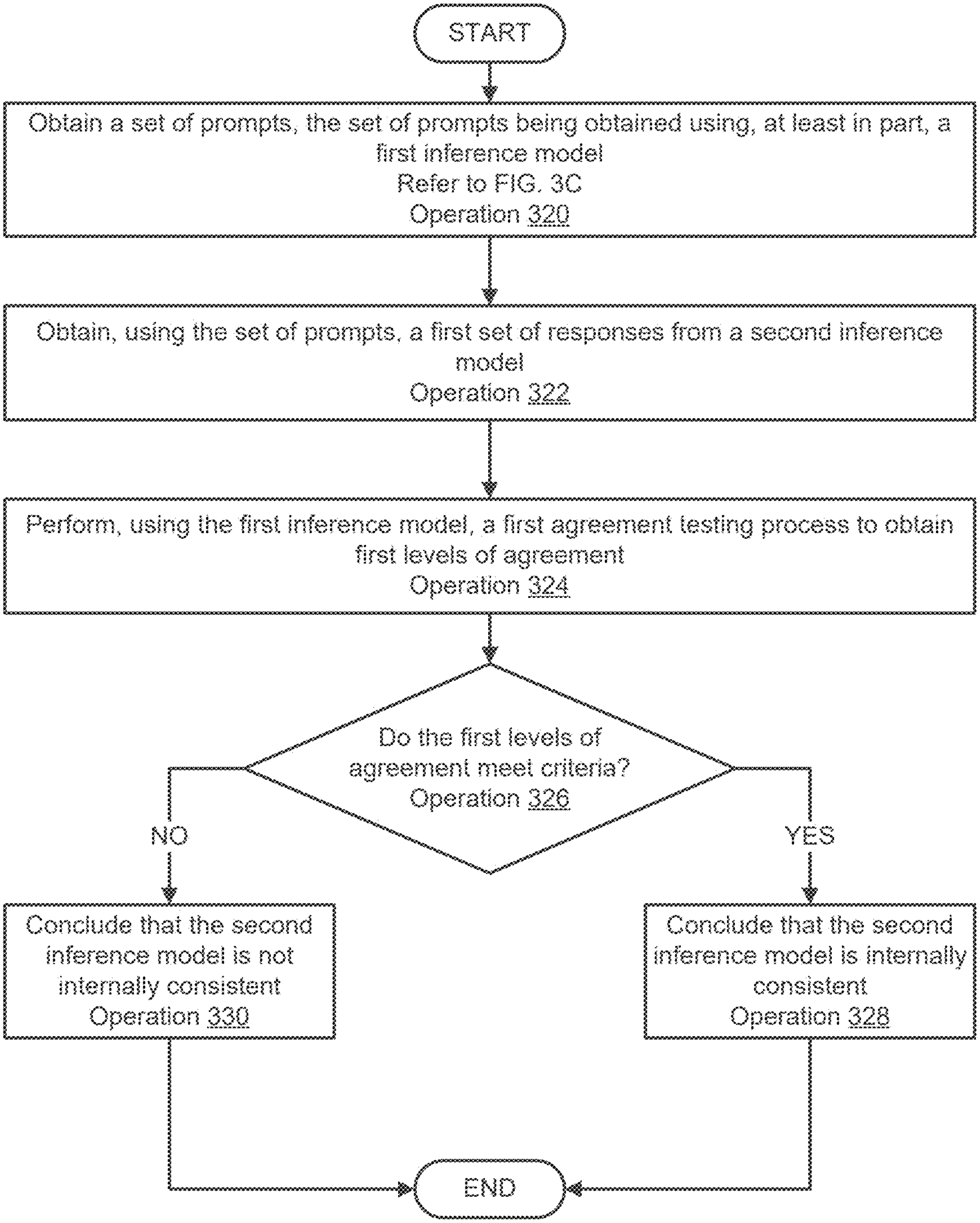
FIG. 3B shows a flow diagram illustrating a method of testing an internal consistency of an inference model in accordance with an embodiment.
Figure 3C:
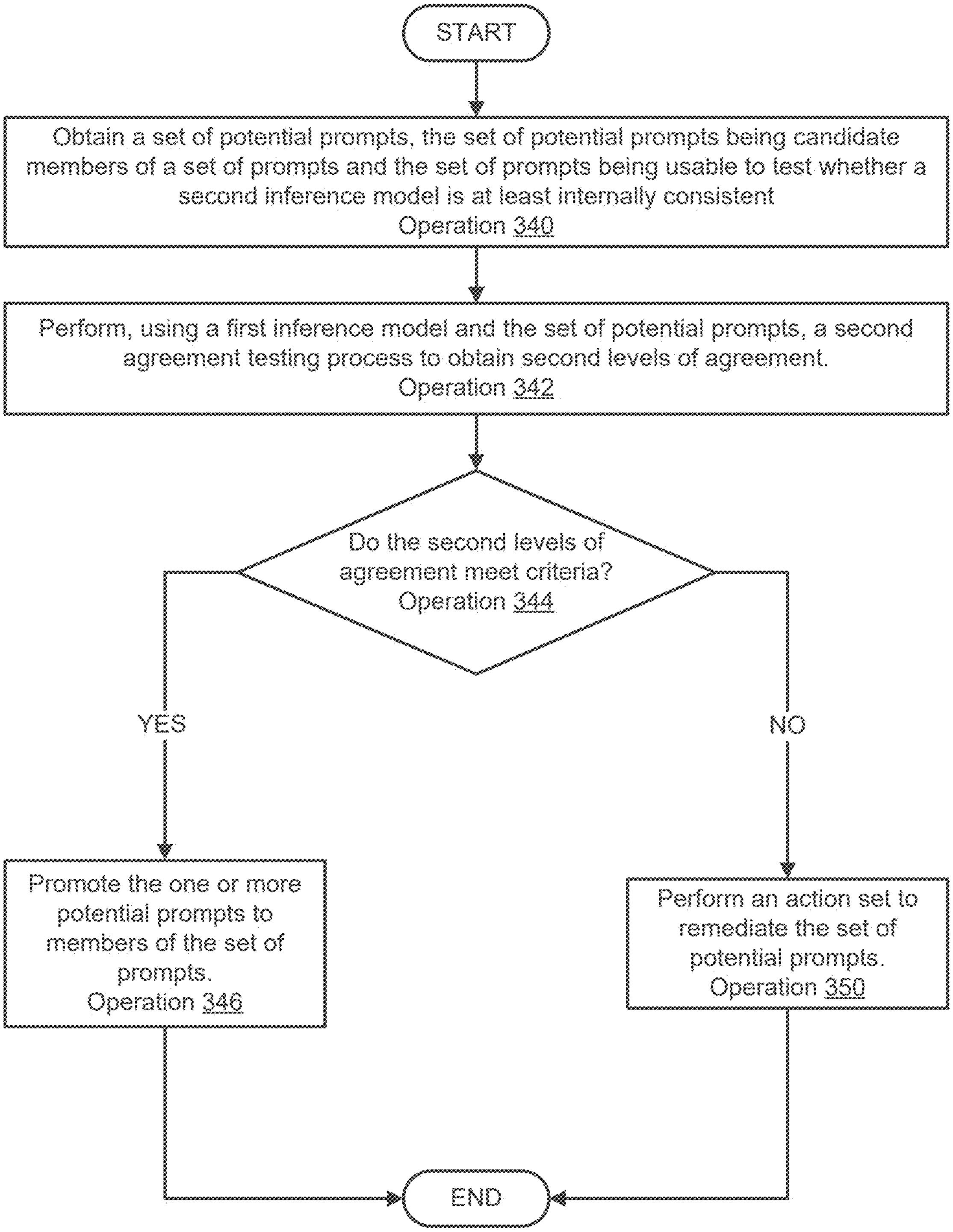
FIG. 3C shows a flow diagram illustrating a method of testing a consistency of a set of prompts in accordance with an embodiment.

As discussed above, the components of FIGS. 1-2E may perform various methods to manage inference models. FIGS. 3A-3C illustrate a method that may be performed by the components of the system of FIGS. 1-2E. In the diagrams discussed below and shown in FIGS. 3A-3C, any of the operations may be repeated, performed in different orders, and/or performed in parallel with or in a partially overlapping in time manner with other operations.

Turning to FIG. 3A, a first flow diagram illustrating a method in accordance with an embodiment is shown. The first flow diagram may illustrate various operations performed while determining whether an inference model is both internally consistent and correct. The method may be performed, for example, by any of the components of the system of FIG. 1, and/or any other entity without departing from embodiments disclosed herein.

At operation 300, an inference model consistency test may be performed, using a set of prompts deemed consistent by a first inference model that is deemed to be both internally consistent and correct, to determine whether a second inference model is internally consistent.

Performing the inference model consistency test may include: (i) obtaining a set of prompts, the set of prompts being obtained using, at least in part, a first inference model, (ii) obtaining, using the set of prompts, a first set of responses from a second inference model, (iii) performing, using the first inference model, a first agreement testing process to obtain first levels of agreement, and/or (iv) determining whether the first levels of agreement meet criteria. If the first levels of agreement meet the criteria, it may be concluded that the second inference model is internally consistent. If the first levels of agreement do not meet the criteria, it may be concluded that the second inference model is not internally consistent. Refer to FIG. 3B for additional details regarding performing the inference model consistency test.

At operation 302, it may be determined whether the second inference model is internally consistent. Determining whether the second inference model is internally consistent may include reading a result of the inference model consistency test described in FIG. 3B.

If the second inference model is deemed internally consistent, the method may proceed to operation 304.

At operation 304, an inter-inference model consistency test may be performed, using the set of prompts, to determine whether the second inference model is consistent with the first inference model. Performing the inter-inference model consistency test may include: (i) obtaining a second set of responses, the second set of responses being generated by the first inference model using the set of prompts, (ii) comparing a first same information content of the first set of responses to a second same information content of the second set of responses to obtain a level of similarity between the first same information content and the second same information content, (iii) determining whether the level of similarity meets a level of similarity threshold, and/or (iv) other methods.

Obtaining the second set of responses may include: (i) providing the set of prompts to the first inference model, and/or (ii) receiving, in response to the set of prompts, the second set of responses from the first inference model. Providing the set of prompts to the inference model may include providing the set of prompts to a remote resource via: (i) transmission via a message, (ii) storing in a storage with subsequent retrieval by the remote resource, (iii) a publish-subscribe system where the remote resource subscribes to updates from an entity providing the set of prompts thereby causing a copy of the set of prompts to be propagated to the remote resource, and/or (iv) other processes.

Obtaining the second set of responses may also include: (i) feeding the set of prompts into the first inference model as ingest data, (ii) obtaining the second set of responses from the first inference model as output, and/or (iii) other methods.

Comparing the first same information content to the second same information content may include: (i) prompting the first inference model to compare the first same information content and the second same information content, (ii) obtaining an output from the first inference model, the output being usable to obtain the level of similarity, and/or (iii) other methods.

Prompting the first inference model to compare the first same information content and the second same information content may include: (i) obtaining a level of similarity prompt, the level of similarity prompt including instructions to compare the first same information content and the second same information content, contextual information usable to compare the first same information content and the second same information content (e.g., instructions for generating the level of similarity), and/or other information, (ii) providing the level of similarity prompt to the first inference model (e.g., providing the level of similarity prompt to an entity hosting the first inference model, feeding the level of similarity prompt to the first inference model as ingest), and/or (iii) other methods.

Comparing the first same information content to the second same information content may also include obtaining the level of similarity. Obtaining the level of similarity may include: (i) parsing the output from the first inference model to identify the level of similarity from the output, (ii) performing an analysis process and/or a data processing process using the output from the first inference model to obtain the level of similarity, and/or (iii) other methods.

Determining whether the level of similarity meets the level of similarity threshold may include: (i) obtaining the level of similarity threshold (e.g., reading the level of similarity threshold from storage, receiving the level of similarity threshold from another entity, generating the level of similarity threshold), (ii) comparing a quantity of the level of similarity to a corresponding quantity of the level of similarity threshold, and/or (iii) other methods. Determining whether the level of similarity meets the level of similarity threshold may also include providing the level of similarity and the level of similarity threshold to another entity responsible for comparing the level of similarity to the level of similarity threshold.

At operation 306, it may be determined whether the second inference model is consistent with the first inference model. Determining whether the second inference model is consistent with the first inference model may include reading a result indicating whether the level of similarity meets the level of similarity threshold. If the level of similarity meets the level of similarity threshold, the second inference model may be consistent with the first inference model and the method may proceed to operation 308. If the level of similarity does not meet the level of similarity threshold, the second inference model may not be consistent with the first inference model and the method may proceed to operation 312.

At operation 308, it may be concluded that the second inference model is both internally consistent and correct. Concluding that the second inference model is both internally consistent and correct may include: (i) generating a data structure indicating that the second inference model has been deemed internally consistent via an inference model consistency test (e.g., described at operation 300) and correct via an inter-inference model consistency test with respect to the first inference model (e.g., described at operation 304), (ii) storing the data structure in a database and/or other storage architecture for retrieval during providing the computer-implemented services, (iii) notifying (e.g., via a message over a communication system, via a graphical user interface (GUI) on a device) another entity (e.g., the remote resource, the local resource, a downstream consumer) that the second inference model is both internally consistent and correct and, therefore, approved for use in providing the computer-implemented services, and/or (iv) other methods.

At operation 310, the computer-implemented services may be provided using at least the second inference model. Providing the computer-implemented services using at least the second inference model may include: (i) obtaining a new prompt for the second inference model, (ii) providing the new prompt to the second inference model (e.g., via transmission of a message including the new prompt to the remote resource), (iii) receiving, in response to the new prompt, a new response generated by the second inference model (e.g., from the remote resource), (iv) providing at least a portion of the new response to a downstream consumer as part of providing the computer-implemented services, (v) using at least a portion of the new response to make decisions related to provisioning of the computer-implemented services, and/or (vi) other methods.

Providing the computer-implemented services using at least the second inference model may also include replacing the first inference model with the second inference model. Replacing the first inference model with the second inference model may include: (i) modifying instructions for inference generation, the instructions including a list of inference models usable for generation of inferences during providing the computer-implemented services (e.g., removing the first inference model from the list, adding the second inference model to the list, labeling the first inference model in the list as being replaced by the second inference model), (ii) providing the instructions and/or another notification to any entity (e.g., the remote resource, a downstream consumer) indicating that the first inference model is to be replaced by the second inference model, and/or (iii) other methods.

The method may end following operation 310.

Returning to operation 302, the method may proceed to operation 312 if the second inference model is not internally consistent. At operation 312, the second inference model may be provisionally rejected for use in providing the computer-implemented services. Provisionally rejecting the second inference model for providing the computer-implemented services may include: (i) not approving the second inference model for inference generation during provision of the computer-implemented services, (ii) labeling the second inference model (e.g., in a database, in a data structure, in instructions for providing the computer-implemented services) for additional training and/or additional evaluation processes, (iii) notifying any entity (e.g., the remote resource, a downstream consumer) that the second inference model has not been approved for use in providing the computer-implemented services, and/or (iv) other methods.

The method may end following operation 312.

Thus, as illustrated above, embodiments disclosed herein may provide systems and methods usable to manage inference models so that an internal consistency and/or a correctness of an inference model hosted by a remote resource (e.g., a third party) may be evaluated using a trusted inference model deemed internally consistent and correct. By doing so, an efficiency of evaluating the inference model may be increased (e.g., via reduction of a resource cost) and a likelihood of providing the computer-implemented services as desired may be increased.

Turning to FIG. 3B, a second flow diagram illustrating a method in accordance with an embodiment is shown. The second flow diagram may illustrate various operations performed while determining whether an internal consistency of a second inference model is acceptable for providing computer-implemented services to downstream consumers of the computer-implemented services using a set of prompts deemed consistent by a first inference model that is deemed to be both internally consistent and correct. The operations shown in FIG. 3B may be an expansion of operation 300 shown in FIG. 3A. The method may be performed, for example, by any of the components of the system of FIG. 1, and/or any other entity without departing from embodiments disclosed herein.

At operation 320, a set of prompts may be obtained, the set of prompts being obtained using, at least in part, a first inference model. Obtaining the set of prompts may include: (i) reading the set of prompts from storage, (ii) receiving the set of prompts from another entity (e.g., via a transmission over a communication system), (iii) generating the set of prompts, and/or (iv) other methods.

Obtaining the set of prompts may also include: (i) obtaining a set of potential prompts, the set of potential prompts being candidate members of the set of prompts, (ii) performing, using a first inference model and the set of potential prompts, a prompt agreement testing process to obtain second levels of agreement, (iii) determining whether the second levels of agreement meet criteria, (iv) if the second levels of agreement meet the criteria, promoting the one or more potential prompts to members of the set of prompts, (v) if the second levels of agreement do not meet the criteria, performing an action set to remediate the set of potential prompts, and/or (vi) other methods. Refer to FIG. 3C for additional details regarding obtaining the set of prompts.

At operation 322, a first set of responses may be obtained from the second inference model using the set of prompts, the first set of responses including a first response to a first prompt of the set of prompts and a second response to a second prompt of the set of prompts. Obtaining the first set of responses may include: (i) providing the set of prompts to an entity that manages the second inference model (e.g., a remote resource), (ii) receiving, in response to the set of prompts and from the remote resource, the first set of responses. Providing the set of prompts to the remote resource may include: (i) transmission via a message, (ii) storing in a storage with subsequent retrieval by the remote resource, (iii) via a publish-subscribe system where the remote resource subscribes to updates from an entity providing the set of prompts thereby causing a copy of the set of prompts to be propagated to the remote resource, and/or (iv) via other processes.

At operation 324, a first agreement testing process may be performed to obtain first levels of agreement using the first inference model. Performing the first agreement testing process may include: (i) prompting the first inference model to compare an information content of at least the first response and the second response, (ii) obtaining an output from the first inference model, the output being usable to obtain the first levels of agreement, and/or (iii) other methods.

Prompting the first inference model may include: (i) obtaining a response agreement testing prompt, (ii) providing the response agreement testing prompt to the first inference model as ingest, (iii) providing the response agreement testing prompt to another entity responsible for operating the first inference model, and/or (iv) other methods.

Obtaining the output from the first inference model may include: (i) receiving a notification from the first inference model that the output may be available in storage, (ii) reading the output from storage, (iii) receiving the output from another entity responsible for operating the first inference model, and/or (iv) other methods.

Performing the first agreement testing process may also include obtaining the first levels of agreement. Obtaining the first levels of agreement may include: (i) parsing the output from the first inference model to identify the first levels of agreement from the output, (ii) performing an analysis process and/or a data processing process using the output from the first inference model to obtain the first levels of agreement, and/or (iii) other methods.

At operation 326, it may be determined whether the first levels of agreement meet criteria. Determining whether the first levels of agreement meet the criteria may include: (i) obtaining the criteria (e.g., reading the criteria from storage, receiving the criteria from another entity, generating the criteria), (ii) comparing a quantity of the first levels of agreement to a corresponding threshold quantity of the criteria, and/or (iii) other methods. Determining whether the first levels of agreement meet the criteria may also include providing the first levels of agreement and the criteria to another entity responsible for comparing the first levels of agreement to the criteria.

If it is determined that the first levels of agreement meet the criteria, the method may proceed to operation 328. At operation 328, it may be concluded that the second inference model is internally consistent. Concluding that the second inference model is internally consistent may include: (i) generating a data structure indicating that the second inference model has been approved for use in providing computer-implemented services, (ii) storing the data structure in a database and/or other storage architecture for retrieval during providing the computer-implemented services, (iii) notifying (e.g., via a message over a communication system, via a graphical user interface (GUI) on a device) another entity (e.g., the remote resource, the local resource, a downstream consumer) that the second inference model is approved for use in providing the computer-implemented services, and/or (iv) other methods.

The method may end following operation 328.

Returning to operation 326, the method may proceed to operation 330 if the first levels of agreement do not meet the criteria. At operation 330, it may be concluded that the second inference model is not internally consistent. Concluding that the second inference model is not internally consistent may include: (i) generating a data structure indicating that the second inference model has not been approved for use in providing computer-implemented services, (ii) storing the data structure in a database and/or other storage architecture, (iii) notifying (e.g., via a message over a communication system, via a GUI on a device) another entity (e.g., the remote resource, the local resource, a downstream consumer) that the second inference model is not approved for use in providing the computer-implemented services, and/or (iv) other methods.

The method may end following operation 330.

Thus, as illustrated above, embodiments disclosed herein may provide systems and methods usable to manage inference models so that an internal consistency of an inference model hosted by a remote resource (e.g., a third party) may be evaluated using a trusted inference model (e.g., an inference model deemed internally consistent and correct). By doing so, an efficiency of evaluating the internal consistency of the inference model may be increased (e.g., via reduction of a resource cost) and a likelihood of providing the computer-implemented services as desired may be increased.

Turning to FIG. 3C, a third flow diagram illustrating a method in accordance with an embodiment is shown. The third flow diagram may illustrate various operations performed while determining whether a set of prompts is consistent. The operations shown in FIG. 3C may be an expansion of operation 320 shown in FIG. 3B. The method may be performed, for example, by any of the components of the system of FIG. 1, and/or any other entity without departing from embodiments disclosed herein.

At operation 340, a set of potential prompts may be obtained, the set of potential prompts being candidate members of a set of prompts and the set of prompts being usable to test whether at least an internal consistency of a second inference model is acceptable. Obtaining the set of potential prompts may include: (i) receiving the set of potential prompts from an SME, (ii) prompting a third inference model to generate the set of potential prompts, (iii) reading the set of potential prompts from storage, and/or (iv) other methods.

The third inference model may be a third generative AI model (e.g., a third LLM) and prompting the third inference model to generate the set of potential prompts may include: (i) providing a prompt generation prompt to the third inference model, the prompt generation prompt including instructions to generate the set of potential prompts using prompt generation criteria, (ii) obtaining the set of potential prompts as an output from the third inference model, and/or (iii) other methods.

The prompt generation criteria may indicate that each prompt of the set of potential prompts: (i) may include a solicitation for the same information content and, (ii) may use a different phrasing from phrasings used by other prompts of the set of potential prompts.

At operation 342, a second agreement testing process may be performed using a first inference model and the set of potential prompts to obtain second levels of agreement. Performing the second agreement testing process may include: (i) obtaining, using the set of potential prompts, a third set of responses from the first inference model, (ii) comparing an information content of each response of the third set of responses to obtain the second levels of agreement, and/or (iii) other methods.

Obtaining the third set of responses may include: (i) feeding the set of potential prompts into the first inference model as ingest, (ii) obtaining the third set of responses as output from the first inference model, and/or (iii) other methods. Obtaining the third set of responses as output form the first inference model may include: (i) receiving a notification from the first inference model that the third set of responses may be available in storage, (ii) reading the third set of responses from storage, (iii) receiving the third set of responses from another entity responsible for operating the first inference model, and/or (iv) other methods.

Comparing an information content may include: (i) prompting the first inference model to compare the information content of each response of the third set of responses, (ii) obtaining an output from the first inference model, the output being usable to obtain the second levels of agreement, and/or (iii) other methods.

Prompting the first inference model may include: (i) obtaining a response agreement testing prompt, (ii) providing the response agreement testing prompt to the first inference model as ingest, (iii) providing the response agreement testing prompt to another entity responsible for operating the first inference model, and/or (iv) other methods.

Obtaining the output from the first inference model may include: (i) receiving a notification from the first inference model that the output may be available in storage, (ii) reading the output from storage, (iii) receiving the output from another entity responsible for operating the first inference model, and/or (iv) other methods.

Comparing an information content may also include obtaining the second levels of agreement. Obtaining the second levels of agreement may include: (i) parsing the output from the first inference model to identify the second levels of agreement from the output, (ii) performing an analysis process and/or a data processing process using the output from the first inference model to obtain the second levels of agreement, and/or (iii) other methods.

At operation 344, it may be determined whether the second levels of agreement meet criteria. Determining whether the second levels of agreement meet the criteria may include: (i) obtaining the criteria (e.g., reading the criteria from storage, receiving the criteria from another entity, generating the criteria), (ii) comparing a quantity of the second levels of agreement to a corresponding threshold of the criteria, and/or (iii) other methods. Determining whether the second levels of agreement meet the criteria may also include providing the second levels of agreement and the criteria to another entity responsible for comparing the second levels of agreement to the criteria.

If it is determined that the second levels of agreement meet the criteria (e.g., the determination is "Yes" at operation 304), then the method may proceed to operation 306.

At operation 346, the one or more potential prompts may be promoted to members of the set of prompts. Promoting the one or more potential prompts may include: (i) using the one or more potential prompts as the set of prompts (e.g., generating a data structure and populating the data structure with the one or more potential prompts to be used as the set of prompts), (ii) adding the one or more potential prompts to an existing set of prompts, (iii) replacing prompts in an existing set of prompts with the one or more potential prompts, (iv) storing the one or more potential prompts in a database of sets of prompts, and/or (vi) other methods.

The method may end following operation 346.

Returning to operation 344, if it is determined that the second levels of agreement do not meet the criteria (e.g., the determination is "No" at operation 344), then the method may proceed to operation 350.

At operation 350, an action set may be performed to remediate the set of potential prompts. Performing the action set may include: (i) modifying the set of potential prompts to obtain an updated set of potential prompts, the updated set of potential prompts including one or more updated potential prompts, (ii) performing, using the first inference model and the updated set of potential prompts, a third prompt agreement testing process to obtain updated levels of agreement, (iii) making a determination regarding whether the updated levels of agreement meet the criteria, and/or (iv) other methods.

Modifying the set of potential prompts may include removing at least one potential prompt from the set of potential prompts to obtain the updated set of potential prompts, the at least one potential prompt exhibiting a level of agreement of the second levels of agreement that does not meet the criteria. Removing the at least one potential prompt may include: (i) deleting the at least one potential prompt from the set of potential prompts to obtain an updated set of potential prompts, (ii) replacing the at least one potential prompt with a different potential prompt to obtain an updated set of potential prompts, (iii) providing the set of potential prompts to another entity and receiving the updated set of potential prompts with the at least one potential prompt removed in response, and/or (iv) other methods.

Modifying the set of potential prompts may also include: (i) identifying, by the first inference model, at least one potential prompt from the set of potential prompts that exhibits a level of agreement of the second levels of agreement that does not meet the criteria, (ii) prompting the first inference model to modify the at least one potential prompt to increase a likelihood that the updated levels of agreement meet the criteria, and/or (iii) other methods.

Identifying the at least one potential prompt may include: (i) providing the first inference model a prompt, the prompt including instructions for the first inference model to identify the at least one potential prompt, (ii) obtaining a list of potential prompts that exhibit a level of agreement that does not meet the criteria as output from the first inference model, the list of potential prompts including the at least one potential prompt, and/or (iii) other methods.

Prompting the first inference model to modify the at least one potential prompt may include: (i) providing the first inference model a prompt, the prompt including instructions for the first inference model to modify the at least one potential prompt, (ii) identifying, by the first inference model, a cause for the at least one prompt eliciting a response with a level of agreement that does not meet the criteria (e.g., by analyzing syntax, word choice, information content included in the at least one prompt, and/or other characteristics of the at least one prompt), (iii) updating the at least one prompt based on the identified cause (e.g., by replacing words, adding and/or removing information content), (iv) adding additional prompts to the set of potential prompts based on the identified cause, and/or (v) other methods.

Performing the third prompt agreement testing process may include: (i) obtaining, using the set of updated potential prompts, a set of updated responses from the first inference model, (ii) comparing an information content of each updated response of the set of updated responses to obtain the levels of agreement, and/or (iii) other methods.

Making the determination regarding whether the updated levels of agreement meet the criteria may include: (i) obtaining the criteria (e.g., reading the criteria from storage, receiving the criteria from another entity, generating the criteria), (ii) comparing a quantity of the updated levels of agreement to a corresponding threshold of the criteria, and/or (iii) other methods. Determining whether the updated levels of agreement meet the criteria may also include providing the updated levels of agreement and the criteria to another entity responsible for comparing the updated levels of agreement to the criteria.

If it is determined that the updated levels of agreement meet the criteria: (i) the one or more updated potential prompts may be promoted to members of the set of prompts, and/or (ii) after the one or more updated potential prompts are promoted to the members of the set of prompts, the set of prompts may be used to determine whether the second inference model is at least internally consistent.

Promoting the one or more updated potential prompts may include: (i) treating the one or more updated potential prompts as the set of prompts, (ii) adding the one or more updated potential prompts to an existing set of prompts, (iii) replacing prompts in an existing set of prompts with the one or more updated potential prompts, (iv) storing the one or more updated potential prompts in a database of sets of prompts, and/or (v) other methods.

If it is determined that the updated levels of agreement do not meet the criteria, an action set may be performed to remediate the updated set of potential prompts. Performing the action set may include (i) continuing to modify the updated set of potential prompts until the updated levels of agreement meet the criteria, and/or (ii) modifying the updated set of potential prompts a predetermined number of times. After modifying the updated set of potential prompts a predetermined number of times, if the criteria are not met, it may be determined that all or a portion of the updated potential prompts are not to be used to evaluate the consistency of the inference model.

The method may end following operation 350.

Thus, as illustrated above, embodiments disclosed herein may provide systems and methods usable to manage inference models so that an internal consistency and/or a correctness of an inference model hosted by a remote resource (e.g., a third party) may be evaluated using a trusted inference model. By doing so, an efficiency of evaluating the internal consistency and/or the correctness of the inference model may be increased (e.g., via reduction of a resource cost) and a likelihood of providing the computer-implemented services as desired may be increased.

Figure 4:
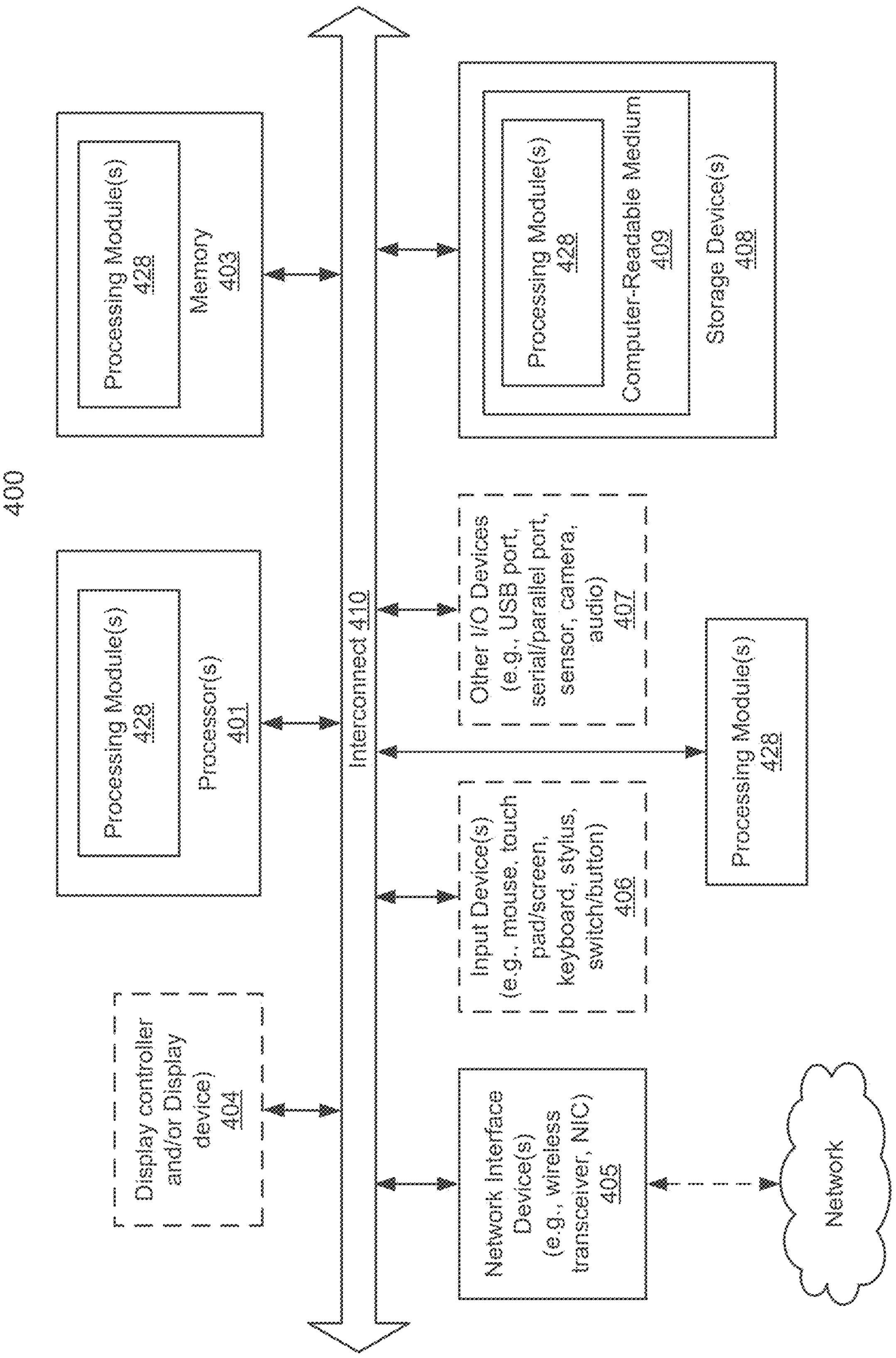
FIG. 4 shows a block diagram illustrating a data processing system in accordance with an embodiment.

Any of the components illustrated in FIGS. 1-2E may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high-level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random-access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a Wi-Fi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also, a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs, or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for managing inference models, the method comprising:

performing, using a set of prompts deemed to be consistent by a first inference model of the inference models that is deemed to be both internally consistent and correct, an inference model consistency test to determine whether a second inference model of the inference models is internally consistent;

in an instance of the performing in which the second inference model is internally consistent:

performing, using the set of prompts, an inter-inference model consistency test to determine whether the second inference model is consistent with the first inference model;

in an instance of the performing where the second inference model is consistent with the first inference model:

concluding that the second inference model is both internally consistent and correct; and providing computer-implemented services using at least the second inference model.

2. The method of claim 1, wherein performing the inference model consistency test comprises:

obtaining the set of prompts, the set of prompts being obtained using, at least in part, the first inference model; and obtaining, using the set of prompts, a first set of responses from the second inference model of the inference models.

3. The method of claim 2, wherein performing the inference model consistency test further comprises:

performing, using the first inference model and the first set of responses, a first agreement testing process to obtain first levels of agreement;

making a determination regarding whether the first levels of agreement meet criteria;

in a first instance of the determination in which the first levels of agreement meet the criteria:

concluding that the second inference model is internally consistent; and in a second instance of the determination in which the first levels of agreement do not meet the criteria:

concluding that the second inference model is not internally consistent.

4. The method of claim 3, wherein performing the first agreement testing process comprises:

prompting the first inference model to compare an information content of at least a first response of the first set of responses and a second response of the first set of responses; and obtaining an output from the first inference model, the output being usable to obtain the first levels of agreement.

5. The method of claim 4, wherein the first response has a first information content, the second response has a second information content, and the first levels of agreement indicate a degree of similarity between at least the first information content and the second information content.

6. The method of claim 2, wherein performing the inter-inference model consistency test comprises:

obtaining a second set of responses, the second set of responses being generated by the first inference model using the set of prompts;

comparing a first same information content of the first set of responses to a second same information content of the second set of responses to obtain a level of similarity between the first same information content and the second same information content; and making a determination regarding whether the level of similarity meets a level of similarity threshold.

7. The method of claim 1, further comprising:

in a second instance of the performing where the second inference model is not consistent with the first inference model:

provisionally rejecting the second inference model for use in providing the computer-implemented services.

8. The method of claim 1, wherein providing the computer-implemented services using at least the second inference model comprises replacing the first inference model with the second inference model.

9. The method of claim 1, wherein each prompt of the set of prompts:

is a solicitation for a same information content; and uses a different phrasing from phrasings used by other prompts of the set of prompts.

10. The method of claim 9, wherein inference models are deemed to be correct when responses generated by the inference models to the set of prompts provide the same information content.

11. The method of claim 1, wherein obtaining the set of prompts comprises:

obtaining a set of potential prompts that comprises one or more potential prompts, the one or more potential prompts being candidate members of a set of prompts and the set of prompts being usable to test whether the second inference model is at least internally consistent;

performing, using the first inference model and the set of potential prompts, a second agreement testing process to obtain second levels of agreement;

making a determination regarding whether the second levels of agreement meet criteria;

in a first instance of the determination in which the second levels of agreement meet the criteria:

promoting the one or more potential prompts to members of the set of prompts, and in a second instance of the determination in which the second levels of agreement do not meet the criteria; and performing an action set to remediate the set of potential prompts.

12. The method of claim 1, wherein the first inference model is a first large language model (LLM) and the second inference model is a second LLM.

13. The method of claim 1, wherein the second inference model is a generative artificial intelligence (AI) model hosted by a remote resource.

14. The method of claim 13, wherein the set of prompts are obtained using a local resource.

15. The method of claim 14, wherein the local resource is owned by a first owner and the remote resource is owned by a second owner.

16. The method of claim 15, wherein the remote resource is not controlled by the first owner.

17. A non-transitory machine-readable medium having instructions stored therein, which when executed by a processor, cause the processor to perform operations for managing inference models, the operations comprising:

performing, using a set of prompts deemed to be consistent by a first inference model of the inference models that is deemed to be both internally consistent and correct, an inference model consistency test to determine whether a second inference model of the inference models is internally consistent;

in an instance of the performing in which the second inference model is internally consistent:

performing, using the set of prompts, an inter-inference model consistency test to determine whether the second inference model is consistent with the first inference model;

in an instance of the performing where the second inference model is consistent with the first inference model:

concluding that the second inference model is both internally consistent and correct; and providing computer-implemented services using at least the second inference model.

18. The non-transitory machine-readable medium of claim 17, wherein performing the inference model consistency test comprises:

obtaining the set of prompts, the set of prompts being obtained using, at least in part, the first inference model; and obtaining, using the set of prompts, a first set of responses from the second inference model of the inference models.

19. A data processing system, comprising:

a processor; and a memory coupled to the processor to store instructions, which when executed by the processor, cause the processor to perform operations for managing inference models, the operations comprising:

performing, using a set of prompts deemed to be consistent by a first inference model of the inference models that is deemed to be both internally consistent and correct, an inference model consistency test to determine whether a second inference model of the inference models is internally consistent;

in an instance of the performing in which the second inference model is internally consistent:

performing, using the set of prompts, an inter-inference model consistency test to determine whether the second inference model is consistent with the first inference model;

in an instance of the performing where the second inference model is consistent with the first inference model:

concluding that the second inference model is both internally consistent and correct; and providing computer-implemented services using at least the second inference model.

20. The data processing system of claim 19, wherein performing the inference model consistency test comprises:

obtaining the set of prompts, the set of prompts being obtained using, at least in part, the first inference model; and obtaining, using the set of prompts, a first set of responses from the second inference model of the inference models.

* * * * *